United States Patent
Mritunjai et al.

(10) Patent No.: US 12,495,078 B1
(45) Date of Patent: *Dec. 9, 2025

(54) ACCESS CONTROL POLICY OPTIMIZATION

(71) Applicant: Amazon Technologies, Inc., Seattle, WA (US)

(72) Inventors: Akhilesh Mritunjai, Seattle, WA (US); Christopher Richard Jacques De Kadt, Parksville (CA); Emina Torlak, Seattle, WA (US); Neha Rungta, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 151 days.

This patent is subject to a terminal disclaimer.

(21) Appl. No.: 18/375,154

(22) Filed: Sep. 29, 2023

(51) Int. Cl.
*H04L 9/40* (2022.01)
*H04L 29/06* (2006.01)

(52) U.S. Cl.
CPC ................... *H04L 63/205* (2013.01)

(58) Field of Classification Search
CPC ....... H04L 63/205; H04L 63/20; H04L 63/10; H04L 63/107; H04L 63/108; H04L 63/101; H04L 63/16
See application file for complete search history.

(56) References Cited

U.S. PATENT DOCUMENTS

| | | | |
|---|---|---|---|
| 10,719,373 B1* | 7/2020 | Koponen | G06F 9/54 |
| 2005/0114704 A1* | 5/2005 | Swander | H04L 63/0263 |
| | | | 713/153 |
| 2007/0157288 A1* | 7/2007 | Lim | H04L 63/105 |
| | | | 726/1 |
| 2014/0282831 A1* | 9/2014 | Pedroza | H04L 63/20 |
| | | | 726/1 |

OTHER PUBLICATIONS

Non-Final Office Action, U.S. Appl. No. 18/375,154, May 8, 2025, 16 pages.

* cited by examiner

*Primary Examiner* — Edward Zee
(74) *Attorney, Agent, or Firm* — Nicholson De Vos Webster & Elliott LLP

(57) ABSTRACT

Techniques include optimizing a base access control policy, resulting in a residual access control policy, which is then indexed. Upon receiving an access request, the system retrieves the residual access control policy from the index using the request's attributes. The access request is then evaluated against the residual policy to make an authorization decision, which is promptly returned. This streamlined process efficiently evaluates and determines authorization, enhancing the speed and accuracy of access control decisions.

20 Claims, 10 Drawing Sheets

ACCESS CONTROL POLICY OPTIMIZATION

BACKGROUND

An identity and access management system typically includes a policy enforcement point (PEP), a policy decision point (PDP), a policy information point (PIP), and a policy administration point (PAP). The PEP is the "gatekeeper" component responsible for intercepting access requests to objects (resources), determining whether authorization decisions are needed, and enforcing decisions. The PDP evaluates the access requests against defined access control policies to make authorization decisions (e.g., allow or deny). The PIP provides the access control policies and additional information or attributes that the PDP uses to make decisions. The PAP is where the policies are created, managed, and stored.

There are technical challenges in determining and evaluating the policies applied to access requests, with scalability and performance being major concerns. Access request evaluation by the Policy Decision Point (PDP) is usually synchronous and can contribute to request latency, adversely affecting user experience and perception of application quality. It can be important to minimize this latency to prevent the PDP from becoming a processing bottleneck and to maintain a competitive edge in identity and access management services offered to developers. Speeding up PDP's access request evaluation not only reduces latency but also improves the processing pipeline's throughput. This improvement can manifest in various ways, including increased parallelism, optimized resource utilization, faster queue processing, improved load balancing, accelerated feedback loops, enhanced error recovery, and the enablement of additional optimizations like efficient algorithms or caching mechanisms. Ultimately, these enhancements lead to higher user concurrency and a better user experience due to faster response times to access requests.

BRIEF DESCRIPTION OF DRAWINGS

Various examples in accordance with the present disclosure will be described with reference to the drawings, in which.

DETAILED DESCRIPTION

Figure 1:
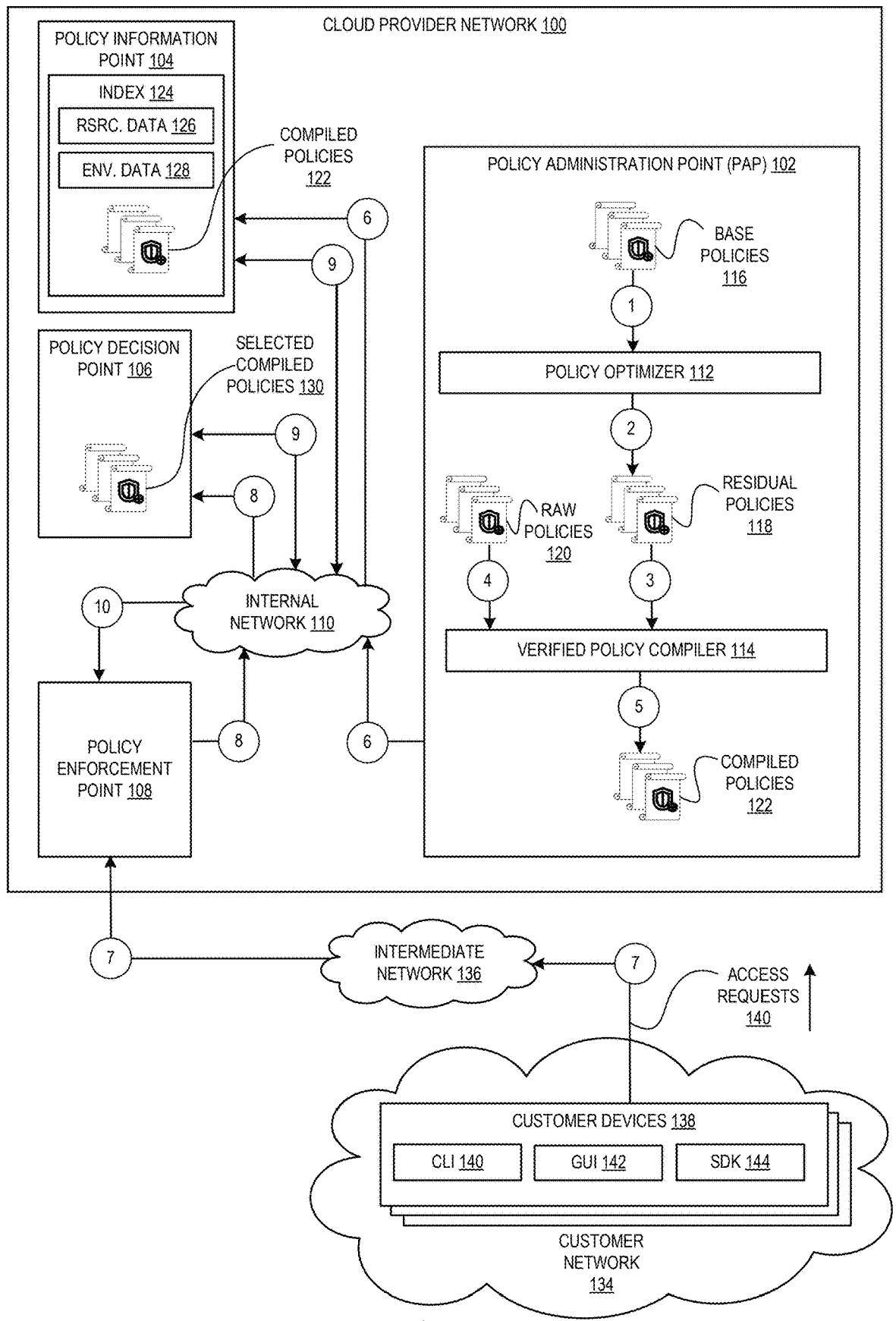
FIG. 1 illustrates an example system and an example method for access control policy optimization and verified compilation.

The present disclosure relates to methods, apparatus, systems, and non-transitory computer-readable storage media for access control policy optimization and verified compilation. An identity and access management system includes four components: a policy enforcement point (PEP), policy decision point (PDP), policy information point (PIP), and policy administration point (PAP). The PEP acts as a gatekeeper, intercepting and enforcing access requests. The PDP evaluates these requests against policies to decide authorization. The PIP offers necessary information for the PDP's decision, and the PAP manages these policies. Technical challenges arise in evaluating access requests against policies, primarily regarding scalability and performance. Delays in evaluation can result in user-perceived unresponsiveness and may drive developers to competitors. Faster evaluations can enhance pipeline throughput and user experience, optimizing resource utilization, load balancing, and reducing queuing. The disclosed techniques reduce latency through "policy optimization" and "verified policy compilation." Policy optimization pre-computes certain policy sections, simplifying real-time evaluations. Verified policy compilation transforms policies into an efficient format while maintaining their original intent, further reducing latency.

General Overview

An identity and access management system typically includes a policy enforcement point (PEP), a policy decision point (PDP), a policy information point (PIP), and a policy administration point (PAP). The PEP is the "gatekeeper" component responsible for intercepting access requests to objects (resources) (e.g., requests to retrieve data from an access-controlled database), determining whether authorization decisions are needed, and enforcing the decisions. The PDP evaluates the access requests against defined policies to make the authorization decisions (e.g., allow or deny). The PIP provides the policies and additional environmental and resource information that the PDP uses to make the decisions. The PAP is where the policies are created, managed, and stored.

There are technical challenges involved in determining the policies that apply to a given access request and evaluating the access request against the selected policies. One challenge is scalability and performance. The evaluation of access requests against policies by the PDP is typically synchronous in that, in many cases, the access requests are not allowed to proceed with requested actions (e.g., retrieve data from database) until the PDP has determined they are authorized to do so. As a result, the evaluation of access requests by the PDP contributes to the latencies of the access requests.

Reducing or minimizing access request latency is important. If access request latency is too long, it may be noticeable to end-users of an application such that the end-users perceive the application to be unresponsive or of poor quality. If the PDP is a component of an identity and access management service that is offered to application developers, the developers may choose to use a competitor's service that makes quicker authorization decisions. In any case, the PDP should quickly evaluate access requests to avoid becoming a bottleneck in an access request processing pipeline.

Not only can quicker access request evaluation by the PDP reduce the latency of an access request through the pipeline, it can increase the throughput capability of the pipeline through any or all of: increased parallelism by being able to process more access requests in the same unit of time; optimized resource utilization because resources like CPU, memory, I/O channels are freed more quickly; reduced queuing because access request queues are processed faster; improved load balancing because load balancers can distribute incoming access request traffic more evenly; feedback loop acceleration where access requests result in subsequent system actions such as follow-up requests or multi-step processes; better error recovery by decreasing the likelihood of access request timeouts and leading to fewer retries; unlocking additional optimizations such as more efficient algorithms or caching mechanisms enabling by the latency reductions; or high user concurrency resulting in an improved user experience as individual users experience faster responses to their access requests.

The techniques disclosed herein reduce access request latency through two optimizations which can be used independently or together. One optimization is termed "policy optimization." The other optimization is termed "verified policy compilation."

In some examples, policy optimization includes pre-computing portions of policies for known static inputs resulting in simpler policies (termed "residual policies") that can be evaluated more quickly by the PDP. By pre-computing parts of access control policies, the runtime evaluation of the residual policies becomes simpler and faster for the PDP. Instead of evaluating the entire original policy, the PDP need only evaluate the residual policy that pertains to the dynamic inputs for a given access request, resulting in reduced access request latency.

In some examples, policy optimization also facilitates efficient handling of large policy sets. In large-scale identity and access management systems, there can be vast sets of complex policies. Evaluating every relevant policy for every access request can be costly for the PDP and the access request processing pipeline. Policy optimization aids in breaking down large policy sets into more management subsets that are quicker and simpler for the PDP to evaluate at runtime during actual access requests, resulting in lower access request latency.

In some examples, verified policy compilation includes transforming policies including possibly residual policies into a more efficient, lower-level, representation while ensuring that the transformed representation correctly implements original policy's intent. By doing so, the PDP can evaluate the more efficient representation during access requests, resulting in reduced access request latency.

These and other examples will now be described with respect to the drawings.

Example System and Method for Access Control Policy Optimization and Verified Compilation FIG. 1 illustrates an example system and an example method for access control policy optimization and verified compilation. Briefly, the example system encompasses cloud provider network 100 that includes policy administration point (PAP) 102, policy information point (PIP) 104, policy decision point (PDP) 106, and policy enforcement point (PEP) 108, all interconnected by internal network 110. PAP 102 includes policy optimizer 112 and verified policy compiler 114. Base policies 116 are input to policy optimizer 112 which outputs residual policies 118. Raw policies 120 and residual policies 118 are input to verified policy compiler 114 which outputs respective compiled policies 122. Compiled policies 122 are indexed in index 124 at PIP 104 along with resource data 126 and environmental data 128. PEP 108 requests PDP 106 to evaluate (authorize) access requests 140 it receives from customer devices 138 in customer network 134. PDP 106 fetches selected compiled policies 130 from PIP 104 along with resource data 126 and environmental data 128 for evaluation or execution by policy decision point 106 against access requests 140. PDP 106 returns authorization decisions to PEP 108. PEP 108 enforces the authorization decisions on access requests 140. Cloud provider network 100 is interconnected with customer network 134 via intermediate network 136. Customer network 134 contains one or more customer devices 138 which are each configured with command line interface (CLI) 140, graphical user interface (GUI) 142, or software development kit (SDK) 144 for submitted access requests 140.

The example method is depicted in FIG. 1 by directed arrows labeled with numbered circles. The directed arrows represent a direction of data flow and not necessarily the exclusive direction. The numbered circles are used to distinguish one operation from another but not necessarily to imply a strict order in which operations must be performed. At a high level, the example method proceeds at operation 1 where base policies 116 are input to policy optimizer 112. At operation 2, policy optimizer 112 outputs residual policies 118 based on evaluating base policies 116. At operation 3, residual policies 118 are input to verified policy compiler 114. At operation 4, raw policies 120 are input to verified policy compiler 114. At operation 5, verified policy compiler 114 outputs respective compiled policies 122 based on compiling residual policies 118 and raw policies 120. At operation 6, PAP 102 sends compiled policies 122 to PIP 104 for indexing in index 124. At operation 7, customer devices 138 in customer network 134 send access requests 140 which transit intermediate network 136 and are received at PEP 108. At operation 8, PEP 108 requests PDP 106 to evaluate access requests 140. At operation 9, PDP 106 fetches selected compiled policies 130 from PIP 104 needed to evaluate access requests 140 along with resource data 126 and environmental data 128 needed to evaluate access requests 140. At operation 10, authorization decisions made by PDP 106 are returned to PEP 108 which enforces the authorization decisions against access requests 140.

Returning to the top of FIG. 1, the example system includes cloud provider network 100. Cloud provider network 100 may encompass infrastructure and services offered by a cloud service provider that enable customers to deploy, operate, and manage applications and services in the cloud. Cloud provider network 100 may encompass global, national, or regional infrastructure such as data centers, servers, storage, and network devices that ensures that cloud services are available and performant for customers around the world or in a particular geographic region. Cloud provider network 100 may offer various network and application infrastructure services to customers including any or all of: virtual networking services that allow customers to create isolated networks in the cloud that resemble traditional networks but that are decoupled from underlying networking hardware; connectivity services such as virtual private networking (VPN) services that allow customers to connect their virtual networks to on-premises data centers, other cloud environments, or the internet; load balancing services that distribute traffic across multiple servers to ensure application availability and fault tolerance; security services such as firewalls, network access control lists, security groups, and private endpoints to secure resources and data; content delivery network (CDN) services that deliver web content based on the geographic locations of users, website sources, and CDN servers to reduce latency and ensure fast content delivery; and domain name system (DNS) services that translate friendly domain names to network address, making it easier to access applications and resources.

In addition to offering any or all of the aforementioned networking and application infrastructure services, cloud provider network 100 may offer various application services including any or all of: compute services such as virtual machine services, container services, and serverless/function as a service; storage services such as object storage services, block storage services, file storage services, and database services; development and deployment services such as continuous integration and deployment (CI/CD) services, application runtime services, and development tools; analytic services such as big data processing services, data warehousing services, and stream processing services; artificial intelligence and machine learning services such as machine learning platforms, and pre-trained artificial intelligence services for vision, speech, chatbots, etc.; internet-of-things (IoT) services such as IoT device management services; security and identity services such as identity and access management services and cryptographic and secret management services; migration and transfer service such as services that enable customers to move applications, data, and workloads to the cloud; management and monitoring services such as infrastructure and application monitoring services and configuration and management services; and developer tools such as application programming interface (API) gateways and integrated development environments (IDEs), software development kits (SDKs), and command-line tools.

As mentioned, cloud provider network 100 may encompass an identity and access management service. The identity and access management service may enable customers to securely control access to their objects in cloud provider network 100. An "object" can be a logical or physical entity in cloud provider network 100 to which access may be requested. For example, an object can be a logical or physical resource in cloud provider network 100 such as a file, a virtual machine, a container, a service, a network, a database, data, an application object, application data, or other logical or physical entity in the cloud provider network to which access may be requested.

An access request (e.g., one of access requests 140) to access an object in cloud provider network 100 may be made by a subject. The "subject" may be an entity requesting access to the object. For example, the subject can be a user identity, a user group identity, a role identity, a federated user identity, a system process identity, an application identity, a service identity, or an anonymous (public) identity.

The access request may specify an action that the subject is requesting to be performed on the object. The "action" may specify what the subject wants to do with the object. For example, the action may specify that the subject wants to read, write, delete, create, update, or execute the object.

The access request may be associated with environmental data specifying information about the environment or context in which the access request is made. The environmental data or portions thereof may be included in the access request. Additionally, or alternatively, environmental data 128 may be retrieved by policy enforcement point 108 from policy information point 104 in response to policy enforcement point 108 receiving the access request. For example, the environmental data associated with an access request may include any or all of the following information: a source network address (e.g., source IP address) of the access request, a user agent associated with the access request, whether the access request is sent over a cryptographically secure network communications channel (e.g., SSL or TLS), a date and time the access request is made, an identifier of the subject of the access request, whether multi-factor authentication was used to authenticate the subject of the access request, a time when temporary security credentials were issued to the subject of the access request, a source network address within a virtual private cloud from which the access request originated, an identifier of a virtual private cloud (VPC) from which the access request originated, an identifier of an organization to which the subject of the access request belongs, an identifier of a parent or root account associated from which the access request originated, a uniform resource indicator (URI) or portion thereof to which the access request was sent, or an identifier of a referrer in a header of the access request.

Additionally, or alternatively, the access request may be associated with resource data specifying information about the object to which access is requested by the access request. The resource data or portions thereof may be included in the access request. Additionally, or alternatively, resource data 126 may be retrieved by policy enforcement point 108 from policy information point 104 in response to policy enforcement point 108 receiving the access request. For example, the resource data associated with an access request may include any of the following information which varies depending on the type of object to which access is requested by the access request: a path prefix used in the access request where the object is a file system-like object having a path in a file-folder hierarchical namespace, a type of virtual machine where the object is a virtual machine instance, a geographic region of the cloud provider network where the action of the object is being requested, an identifier of a database instance class to which access is requested by the access request where the object is a database object, or any other resource information suitable for the type of object to which access is requested by the access request.

While in some examples such as depicted in FIG. 1 an access request received at policy enforcement point 108 can be sent from a customer device in a customer network, an access request received at policy enforcement point 108 can be sent from a device within cloud provider network 100. For example, an access request can be sent by an application service server in cloud provider network 100 that is requesting another application service to perform an action on an object.

Policy enforcement point 108 enforces access control decisions made by policy decision point 106. In this sense, policy enforcement point 108 functions as a gatekeeper, ensuring that the authorization decisions made by policy decision point 106 are actually applied in practice. In some examples, policy enforcement point 108 is a component of an application service in the cloud provider network. The application service can be any of the aforementioned application services. Any or all of these application services may encompass policy enforcement point 108.

Within cloud provider network 100, several components can function as policy enforcement point 108, depending on the specific service and the layer of the cloud provider network in which the access control is applied. In addition to an application service such as a cloud storage service, policy enforcement point 108 can exist within any of: an application programming interface (API) gateway, a firewall, an application layer such as a web application hosted in the cloud provider network, a web application firewall (WAF), a load balancer, an operating system instance, an operating system container instance, a virtual machine instance, or other location in the cloud provider network where it is appropriate to apply policy-based access control.

Example Method for Enforcing an Authorization Decision on an Access Request

Figure 2:
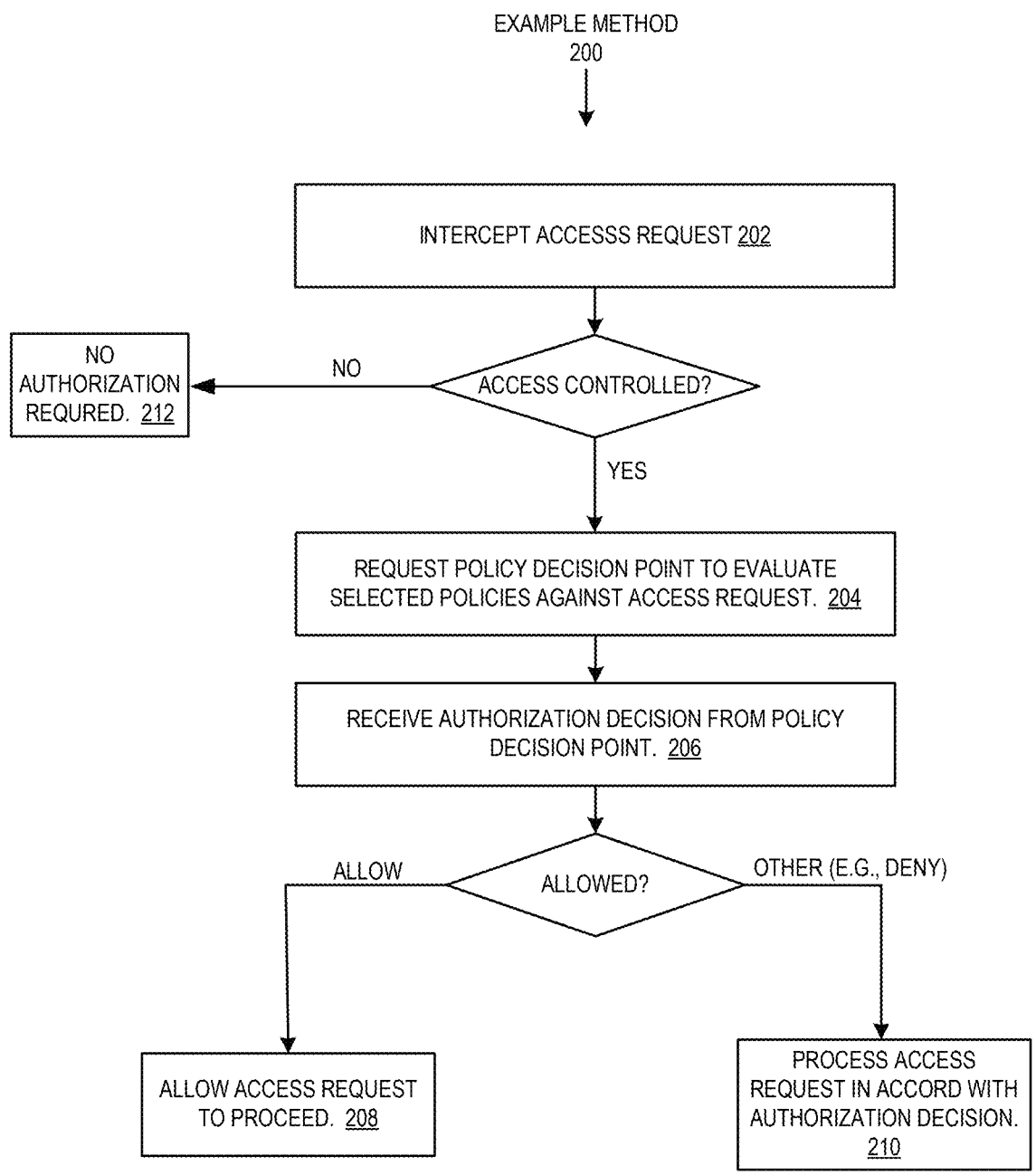
FIG. 2 illustrates an example method for enforcing an authorization decision on an access request.

FIG. 2 illustrates an example method for enforcing an authorization decision on an access request. Example method 200 may be performed by policy enforcement point 108. At a high-level, the policy enforcement point 108 intercepts 202 the access request and makes an initial determination whether the access request is subject to access control authorization. If so, policy enforcement point 108 proceeds to send 204 a structured request to policy decision point 106, asking it to make an authorization decision for the access request based on the relevant policies, environmental data, and resource data. Once policy decision point 106 evaluates the access request against the relevant policies, environmental data, and resource data, it sends back an authorization decision which is received 206 by policy enforcement point 108. The authorization decision can be, for example, "allow" or "permit," "deny," "indeterminate" (e.g., when policy decision point 106 cannot reach a conclusive decision due to some error), "not applicable" (e.g., when no policy applies to the access request), etc. Upon receiving 206 the authorization decision from policy decision point 106, policy enforcement point 108 enforces 208 or 210 the authorization decision.

Returning to the top of example method 200, at operation 202, the access request is intercepted by policy enforcement point 108. The method by which policy enforcement point 108 intercepts the access request may vary depending on the type of system, the nature of the resources being accessed, and the architecture of the access control mechanism. For example, in web-based applications, policy enforcement point 108 can act as middleware, sitting between the requester and the object, processing every access request. As another example, for operating system-level control, policy enforcement point 108 can intercept system calls related to object access (e.g., file or directory access). As yet another example, in database access control, policy enforcement point 108 may use triggers or stored procedures to invoke their logic during actions like SELECT or INSERT. Network resources may employ policy enforcement point 108 in network devices like firewalls, routers, or gateways, which inspect network packets for access decisions. An application may integrate policy enforcement point 108 into a software library or a software development kit (SDK), intercepting object-related function calls. In virtualized environments, policy enforcement point 108 may operate at the hypervisor or orchestration layer, controlling access to virtual resources. In secure setups, policy enforcement point 108 can be at the hardware level, intercepting requests to access hardware objects. As another example, an application wrapper can ensure object access passes through policy enforcement point 108.

If policy enforcement point 108 point determines that the access request is not subject to access control authorization, then example method 200 proceeds to operation 214 where the access request is not subject to authorization. Policy enforcement point 108 may decide that the access request is not subject to access control authorization in various scenarios. For example, policy enforcement point 108 may determine that the object of the access request is a public or otherwise unrestricted object that can be accessed without consulting policy decision point 106. The access request may be a non-sensitive health or status check serving a monitoring or service availability purpose. The access request may be pre-approved via a whitelist or the like. Policy enforcement point 108 may reuse recent cached authorization decisions for identical access requests, sparing policy decision point 106 of evaluation requests within the cache lifespan. The access request may be a non-sensitive operational request like for logging or metrics collection that does not require authorization. The access request may be rate-limited or throttled by policy enforcement point 108 such as where the access request is from a source that has exceeded an allowed request rate based on predefined throttling rules. The access request is malformed or invalid. The access request may be part of an initial setup step according to a standard protocol handshake that does not contain sensitive data and does not require authorization like post-establishment access requests. The access request may conform to a benign or safe request pattern based on regularity or source identifiers that does not require authorization.

If policy enforcement point 108 determines that the access request is subject to access control authorization, then example method 200 proceeds to operation 204 where policy enforcement point 108 requests policy decision point 106 to evaluate the access request against the relevant policies, environmental data, and resource data. The request to evaluate sent to policy decision point 106 can include attributes associated with the access request such as subject attributes (e.g., identity of the subject, user, roles, group memberships, etc.), object attributes (e.g., the type of object, its identifier, classification, etc.), and action attributes (e.g., the kind of operation that is being requested (e.g., create, read, write, update, delete, etc.)). The request to evaluate sent to policy decision point 106 may include environmental data that is used by policy decision point 106 in making the authorization decision. Such environmental data included in the request to evaluate can be, for example, a current time and date for time-bound policies (e.g., certain actions can only be performed during business hours), network context (e.g., IP addresses, domain data, etc.), or system status (e.g., information about system load, security posture, etc.). Policy enforcement point 108 may package attributes and data of the request to evaluate into a structured decision request formatted in a way that policy decision point 106 expects. For example, the structured decision request could be formatted as JavaScript Object Notation (JSON), extensible Markup Language (XML), or extensible Access Control Markup Language (XACML) formatted data. Policy enforcement point 108 may send the request to evaluate to policy decision point 106 over a secured network communication channel or other suitable data communication channel using protocols such as HTTP, HTTPS, SOAP, REST, etc., depending on the system's architecture and specifications.

At operation 208, after policy decision point 106 makes an authorization decision, policy enforcement point 108 receives the authorization decision from policy decision point 106 over the secured network communication channel or other suitable data communication channel. The authorization decision can be received in a structured format that policy enforcement point 108 can interpret. The authorization decision can indicate one of several potentiation decisions such as "permit" or "allow" for when the access request is allowed, "deny" for when the access request is denied, "not applicable" for when there is no applicable policy for the access request, or "indeterminate" for when an error occurred at policy decision point 106 during evaluation or there is insufficient data to make a decision. In some configurations, policy enforcement point 108 can cache the authorization decision for a predetermined period or under certain conditions. This can improve performance by avoiding repeated queries to policy decision point 106 for the same or similar access requests.

Once policy enforcement point 108 receives 206 the authorization decision from policy decision point 206, it acts accordingly. For example, if the authorization decision is allow, then example method 200 proceeds to operation 208 where policy enforcement point 108 allows the access request to proceed which may include allowing the requested action performed on the object of the access request. If the authorization is not allow, permit, or the like, then example method 200 proceeds to operation 210 where policy enforcement point 108 handles the access request appropriately to maintain security and integrity. For example, if policy decision point 106 returns a "deny" decision, then policy enforcement point 108 may enforce this by preventing the requester from accessing the requested object. An error message or notification indicating that access has been denied may be returned to the requester (e.g., the customer device that sent the access request). If policy decision point 106 returns a "not applicable" decision, it means there is no applicable policy for the access request. Policy enforcement point 108 may treat a "not applicable" decision as a "deny" decision for security reasons. In this case, the requester may be informed that there is no policy applicable to the access request, or the requestor may simply receive a deny message or notification. If policy decision point 106 returns an "indeterminate" decision, then an error occurred during evaluation or there is insufficient data to make a decision. Similar to the "not applicable" scenario, policy enforcement point 108 may treat this decision as a "deny." The requestor may receive an error message indicating a system or evaluation error, or simply receive a deny message or notification. If policy enforcement point 108 does not receive any response from policy decision point 106 within a reasonable time frame (e.g., due to network issues, failure of policy decision point 106, etc.), then policy enforcement point 108 may treat the failure to respond as a "deny" decision. In this case, the requester may be informed of the timeout, or of a system or communication error. In some cases, fallback mechanisms may be in place. For example, if policy decision point 106 is a primary system and is unreachable, then policy enforcement point 108 may consult a second or backup policy decision point in cloud provider network 100. Policy enforcement point 108 may additionally or alternatively rely on predefined default behavior or local policies in case of communication failures with policy decision point 106 or other errors.

Example Policy

Figure 3:
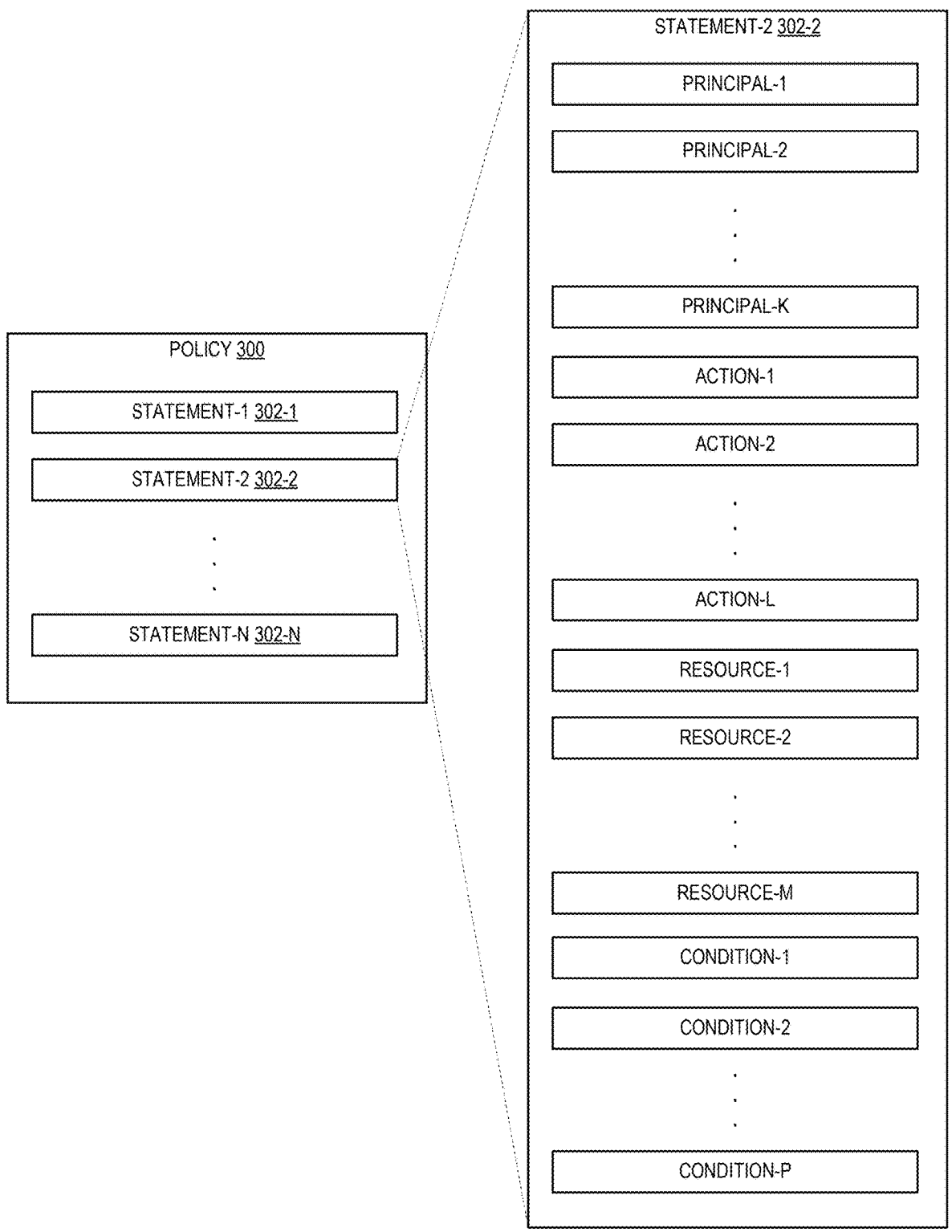
FIG. 3 illustrates an example access control policy.

FIG. 3 illustrates an example access control policy. Policy 300 determines who can access resources, what resources they can access, and what actions they can perform on those resources. Policy 300 may be expressed in terms of principals, actions, resources, and conditions. Principals are identities such as users, groups, services, or applications that can take actions on resources. For instance, a user named "Alice" or an application "AppX" or a service "CloudStorageSvc" can be a principal. Actions are the operations that can be performed on a resource. Examples include reading data from a storage bucket, launching a virtual machine, or deleting a database. Resources are the cloud objects upon which actions are performed. Examples of resources are virtual machines, storage buckets, databases, and network configurations. Conditions are the situational restrictions under which permissions are granted or denied. Conditions might involve time of day, source IP address, using certain authentication methods, etc.

Policy 300 encompasses one or more statements 302-1, 302-2, . . . 302-N. Each statement (sometimes referred to a "role" or "binding") may represent permissions encapsulated in a structured manner. For example, a statement can specify a principal, an action, a resource, an effect, and a condition in JSON format or other suitable data format. The principal may specify the identity or identities (e.g., user, group, role, service, process, application, etc.) that is/are allowed or denied access by the statement. The action may specify the operation or operations that is/are allowed or denied by the statement. The resource may identify the object or objects that is/are governed by the statement. The effect may specify whether the action on the resource by the principal is allowed or denied by the statement.

For example, the following example policy that includes one statement at lines 03-12 allows a user "Alice" to perform the "GetObject" action on the "example-bucket" resource and all resources contained within it under the condition that the access request from "Alice" comes for a specific IP address range:

```
00: {
01: "Version": "2012 Oct. 17",
02: "Statement": [
03: {
04: "Effect": "Allow",
05: "Principal": {"user/Alice"},
06: "Action": "GetObject",
07: "Resource": "example-bucket/*"
08: "Condition": {
09: "IpAddress": {
10: "SourceIp": "192.168.1.0/24"
11: }
12: }
13: }
14: ]
15: }
```

A statement can specify one or more members bound together with a role. This type of statement is sometimes referred to as a "binding." A member can be a user, a group, a domain, or a service account. A role may be a named set of permissions. For example, the following example policy that includes one statement at lines 00-06 that grants permissions to view objects in a cloud data storage bucket to a user with the identifier "alice@example.com," a group with the identifier "devs@example.com," and a service account with the identifier "myapp@appspot.exampleserviceaccount.com."

```
00: {
01: "role": "roles/storage.objectViewer",
02: "members": [
03: "user:alice@example.com",
04: "group:devs@example.com",
05: "serviceAccount:myapp@appspot.exampleserviceaccount.com"
05: ]
06: }
```

In the above example policy, all members listed in the statement have the permissions associated with the "role/storage.objectViewer" role for a resource where the policy is set. For example, if the policy is set at a data storage bucket level, then the specified members can view objects in that particular bucket. If the policy is set at a project level, then the members can view objects in any bucket within the project.

A statement can use role-based access control (RBAC) to grant users, groups, or service principals access to objects. This type of statement is sometimes referred to as a "role." A role may be defined as a collection of permissions. The definition of a role in a statement may contain permissions expressed in the form of allowed actions, not allowed actions, etc. For example, the following example policy includes one statement at lines 00-13 that can be assigned to a user, group, or service principal at the scope specified in "AssignableScopes" field of the role definition, thereby granting the assignee the permissions defined in the "Actions" field. Line 01 specifies the name of the role. Line 02 contains a unique identifier for the role. Line 03 specifies whether the role is a custom role or a built-in role. Line 04 provides a brief description of the role. Lines 05-08 lists the actions that are allowed by the role. In this example, the role allows starting and restarting virtual machine instances. Line 09 lists the actions that are explicitly not allowed by the role, which are none in this example. Lines 10-12 defines where the role can be assigned. In this example, the role assignment is limited to a specific subscription.

00: {
01: "Name": "Virtual Machine Operator",
02: "Id": "88888888-8888-88 88888888",
03: "IsCustom": true,
04: "Description": "Allows for starting and restarting virtual machines.",
05: "Actions": [
06: "Compute/virtualMachines/start/action",
07: "Compute/virtualMachines/restart/action"
08: ],
09: "NotActions": [ ],
10: "AssignableScopes": [
11: "/subscriptions/11111111-1111-1111-1111-111111111111"
12: ]
13: }

Policy optimizer 112 may simplify a policy by "executing" it as much as possible based on a given set of known inputs, reducing the overall complexity and number of statements. This improves the efficiency of policy evaluation by policy decision point 106 at runtime and also makes the policies easier to understand and manage. For example, policy optimizer 112 may reduce the complexity or number of statements in a policy through any or all of: constant folding, by eliminating irrelevant statements, by merging redundant statements, by evaluating nested conditions, or by precomputed derived values.

If there are conditions in a policy that rely on constant values, these conditions can be evaluated by policy optimizer 112 before. For example, if a policy statement expresses in effect "Allow if 'region' is 'US' and 'user-group' is 'admins'," and it is known for a given context that the 'region' is always 'US,'" then policy optimizer 112 can simplify the policy for that context to "Allow if 'user-group' is 'admins'."

Based on the known inputs, some statements can be identified by partial policy evaluator 112 as always false and hence can be removed. As an example, if a given user is only in a "readers" group and not a "writers" group, then policy optimizer 112 can simplify for the given user a policy that contains statements that apply to users in the "readers" group and also contains statements that apply to users in the "writers" group as a policy that only contains the statements that apply to users in the "readers" group and does not contain the statements that apply to users in the "writers" group.

If two or more statements of a policy result in the same outcome under a set of known inputs, policy optimizer 112 can merge them into a single, more general statement. For example, if two separate rules in a policy state: (1) "Allow if 'time' is between 9 am and 12 pm" and (2) "Allow if 'time' is between 12 µm and 3 pm," and policy optimization is performed for a given time that is always between 10 am and 3 pm, then policy optimizer 112 can simplify the two rules into one statement: "Allow if 'time' is between 9 am and 3 pm."

A policy may have a nested or complex condition. Based on known inputs, a nested condition can be pre-evaluated by policy optimizer 112 to simplify the policy. For example, a policy with a statement "Allow if ('region' is 'EU' and 'datacenter' is 'DC1') or ('region' is 'US' and 'datacenter' is 'DC2')" and for a context where "region" is always "US," can be simplified by policy optimizer 112 to "Allow if 'datacenter' is 'DC2'."

If a policy uses derived values such as values computed based on one or more inputs, these values can be precomputed by partial policy evaluator 112 if the inputs are known. For example, for a policy that allows access based on a hashed value of the username, if certain usernames are known during policy optimization, then the hashes for these usernames can be precomputed to simplify the policy checks performed at runtime by policy decision point 106.

Example Method for Evaluating an Access Request Against Relevant Policies

Figure 4:
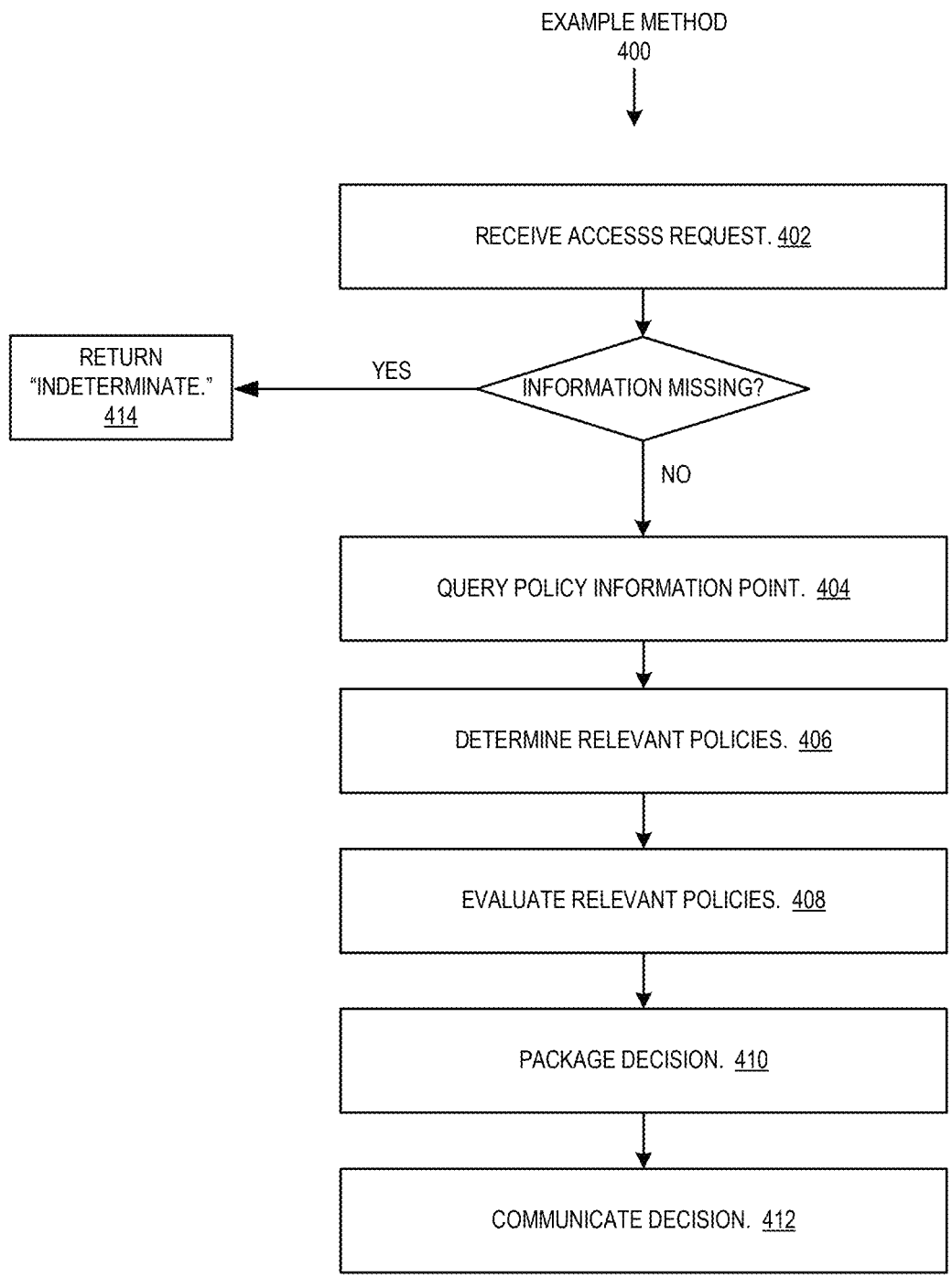
FIG. 4 illustrates an example method for evaluating an access request against relevant policies.

FIG. 4 illustrates an example method for evaluating an access request against relevant policies. Example method 400 may be performed by policy decision point 106. At a high-level, the policy decision point 106 receives an access request from policy enforcement point 108 and makes an initial determination whether any information needed to evaluate the access request is missing from the access request. If not, policy decision point 106 proceeds to query 404 policy information point 104 for selected policies, environmental data, and resource data. Policy decision point 106 determines 406 which of the selected policies are actually relevant to the access request and evaluates 408 the access request against the relevant policies in view of any relevant environmental data and resource data. Upon reaching an authorization decision, policy decision point 106 packages 410 the decision into a standardized format and communicates 412 the packaged decision back to policy enforcement point 108.

Returning to the top of example method 400, at operation 402, policy decision point 106 receives an access request from policy enforcement point 108. Policy enforcement point 108 may construct a structured access request that contains information for policy decision point 106 to make an authorization decision. The access request may be formatted according to the specification of an access control framework in use such as XACML, JSON, or XML. The structured access request received 402 by policy decision point 106 may include information about the entity (e.g., user, service, group, role, etc.) making the access request. This could include a user identifier, service identifier, group identifier, role identifier, group memberships, or other relevant subject attributes. The structured access request can include information about the object that the subject wants to access. For example, the structured access request can include resource attributes such as resource type, identifier, owner, classification level, etc. The structured access request can include information about the action the subject wants to perform on the object. For example, the structured access request can include action attributes such as read, write, create, delete, execute, etc. The structured access request can include information that might affect the authorization decision but is not directly related to the subject or the object. For example, the structured access request may include environmental attributes such the current time, date, network location, system load, etc. In some examples, the structured access request may include a reason or purpose for the access which is used by policy decision point 106 in making the authorization decision.

Once policy enforcement point 108 has formulated the structured access request, it sends it to policy decision point 106 for evaluation. This can be done in various ways include by a direct API calls, network communication, or via intermediate brokers or middleware. Policy decision point 106 receives 402 the access request and begins its evaluation process, parsing the provided attributes and comparing them against relevant policies.

Policy decision point 106 makes an initial determination if any critical information is missing from the access request. Missing critical information could include any or all of: a missing subject identifier, a missing object (resource) identifier, a missing action type, a missing contextual or environmental attribute, a missing role or group membership, a missing resource attribute, missing authentication information, a missing cryptographic signature, or other state of the access request that causes policy decision point 106 to return 414 an "indeterminate" authorization decision such as, for example, a database connection failure, a timeout, or a network communication disruption.

If no critical information is missing from the access request and the state of the access request is otherwise proper, then example method 400 proceeds to operation 404 where policy decision point 106 queries policy information point 104 for selected policies, environmental data, and resource data. After receiving the access request from policy enforcement point 108, policy decision point 106 may determine what specific information or attributes it needs to evaluate the access request. Policy decision point 106 may construct a query specifying what additional data it needs. The query can be based on standards like XACML, JSON, or XML, or proprietary formats, depending on the system in place. The query may identify the type of data needed (e.g., policies, environmental data, resource data) and the criteria for selecting that data. Policy decision point 106 may send the formulated query to policy information point 104 through a direct API call, a network protocol, or other communication method suitable for infrastructure at hand.

The query sent by policy decision point 106 to policy information point 104 may be overinclusive in the sense that the query may select more policies from policy information point 104 than are actually relevant to the access request. The query may be overinclusive for various reasons. For one, being overinclusive can be a safety mechanism to ensure that all relevant policies are selected and reducing or eliminating the probability of allowing the access request when it should have been denied. The query can be overinclusive in its policies selection for other reasons. Policies may encompass generalized policy definitions. If policies are defined broadly or ambiguously, then they may apply to a wide range of access scenarios, even if they are only truly relevant to a subset. As a result, the query may select a larger set of policies than necessary. Policies may lack a clear policy hierarchy, prioritization, or categorization. The query may need to select all available policies instead of selecting only the most relevant ones. In large organizations where multiple parties may define policies, there can be redundancies and overlaps in policy definitions. The query by policy decision point 106 may end up retrieving multiple policies that essentially address the same concern. Some policies may have dependencies or relationships with other policies. To ensure comprehensive evaluation, the query may need to select all related policies even if some of them are not directly applicable to the access request. Over time, as policies are added, modified, or deprecated, there may not always be effective management or cleanup of old or irrelevant policies. With regular policy reviews and maintenance, policy decision 106 may end up with a larger set of policies than necessary. Policy decision point 106 or policy information point 104 may not efficiently filter or match the attributes in the access request to the conditions of policies, resulting in a query that casts a wider net than necessary.

Policy optimizer 112 can perform some policy evaluation work in advance based on known or predictable information. By doing so, policy decision point 106 can streamline runtime access control decisions, making them more efficient and reducing the likelihood of overinclusive selection of policies. Policy optimizer 112 can pre-evaluate policies based on known data, essentially simplifying, or reducing the policies that need to be selected by policy decision point 106 from policy information point 104 at runtime when evaluating access requests. By using optimization, the overinclusive selection of policies from policy information point 104 by policy decision point 106 at runtime can be mitigated in several ways.

Policy optimizer 112 can identify and pre-filter policies that are relevant to a specific type of access request or access request context. By doing so, when evaluating the specific type of access request or in the access request context, policy decision point 106 does not need to select all available policies, only the reduced set of policies resulting from the optimization.

Some policies may be complex, having multiple conditions and dependencies. Policy optimizer 112 can simplify these policies by resolving certain conditions in advance, based on known data. This simplification can reduce the amount of policy data that policy decision point 106 needs to retrieve from policy information point 104 at runtime.

Through optimization, policy optimizer 112 can reduce policies into a more efficient form based on the expected or common attributes of incoming access requests. This residual form can be smaller in data size, reducing the need for policy decision point 106 to retrieve a larger set of policies from policy information point 104 at runtime.

If certain policy attributes are static or change infrequently (e.g., a user's department or a resource's classification level), policy optimizer 112 can pre-process policies related to these attributes, thereby eliminating them from selection by policy decision point 106 unless they change.

By transforming overlapping or redundant policies, policy optimizer 112 can determine in advance which policies are effectively duplicates or subsets of others. This understanding can reduce the number of policies selected by policy decision point 106 at operation 404.

With a reduced and simplified set of policies to select from policy information point 104 at runtime, policy decision point 106 can make quicker authorization decisions, thereby improving the policy decision point 106's overall responsiveness and throughput.

At operation 406, policy decision point 106 determines which of the potentially overinclusive set of policies is actually relevant to the access request at hand. Policy decision point 106 employ several strategies and methods for this determination. The access request may contain specific attributes such as the identity of the requester, the resource being accessed, the action being requested, and possible environmental attributes. Policy decision point 106 can match these attributes against the conditions specified in a selected policy. If the condition of the selected policy does not align with the access request's attributes, then policy decision point 106 can deem the selected policy irrelevant. However, if they do align, then policy decision point 106 can consider the selected policy relevant to the access request and retrain it for the evaluation operation 408.

Selected policies may be organized into categories, hierarchies, or groups. For instance, policies related to database access can be grouped separately from those related to file access. Depending on the nature of the access request, policy decision point 106 can focus only on the relevant category or hierarchy, ignoring the rest.

Selected policies might be ordered based on priority. Policy decision point 106 can start evaluating from the highest priority and stop once a definite decision (permit or deny) is reached, without evaluating the rest.

Selected policies may be tagged or associated with metadata indicating their applicability. For example, a policy might be tagged as "HR Department" or "Sensitive Data". Policy decision point 106 can filter selected policies based on these tags or metadata, considering only those that match the context of the access request.

Some selected policies might be dependent on the results of other policies. If a primary policy is deemed irrelevant or returns a specific result, then policy decision point 106 may skip dependent policies.

Certain selected policies may be applicable only at specific times (e.g., business hours) or under certain environmental conditions (e.g., from specific IP ranges or device types). Policy decision point 106 can immediately discard policies that don't fit the current time or environmental context.

For frequent and similar access requests, policy decision point 106 might cache previous decisions or the set of relevant policies from past evaluations. Using this cache, policy decision point 106 can quickly identify the relevant policies without having to sift through the entire set again.

Policy optimizer 112 can evaluate parts of policies in advance based on known or predictable information. By doing so, the complexity and scope of the policies that need to be evaluated by policy decision point 106 at runtime can be reduced. Through policy optimization 112, certain conditions within policies can be pre-evaluated and simplified. For instance, if a policy has a condition that checks if today's date is after a certain fixed date, that can be pre-evaluated to either true or false. This simplification can make some policies irrelevant or consolidate multiple policies into a single decision.

If certain policy attributes are static or rarely change (e.g., company-wide permissions that are consistent across many users), these can be evaluated in advance by policy optimizer 112. The resulting residual policies, which focus only on dynamic attributes, are more streamlined for runtime evaluation by policy decision point 106.

During optimization, policy optimizer 112 may determine those multiple policies lead to the same decision under the current conditions. Such redundancies can be identified and collapsed into a singular, more generic residual policy or completely discarded, thereby reducing the number of policies policy decision point 106 needs to evaluate at runtime.

Policy optimizer 112 can reduce policies into more efficient forms based on expected scenarios or common attributes of incoming requests. This can result in a set of highly optimized residual policies tailor-made for frequent scenarios, reducing the need for policy decision point 106 to evaluate a broader set of policies at runtime.

Some policies may only be relevant if other policies are applicable. By pre-evaluating these dependencies, policy decision point 106 can determine in advance which policies are primary and which ones are conditional. At runtime, only the primary and relevant conditional residual policies may need evaluation by policy decision point 106.

Based on the attributes frequently seen in access requests, optimizations by policy optimizer 102 can lead to the creation of targeted residual policy subsets optimized for specific scenarios (e.g., access requests from a certain department or for a specific type of resource). At runtime, policy decision point 106 can select or evaluate the appropriate subset from policy information point 104 instead of selecting or evaluating the entire policy set.

At operation 408, policy decision point 106 evaluates the access request against the relevant policies to reach an authorization decision. For a relevant policy, policy decision point 106 evaluates the access request against the policy's conditions. These conditions can involve straightforward matches (e.g., user_role="manager") or more complex evaluations (e.g., logical combinations of multiple attributes, temporal conditions). Environmental or resource data can influence this evaluation. For instance, access might be permitted to a resource only during business hours or from specific IP ranges. If different policies provide conflicting decisions for the same access request (one allows while another denies), policy decision point 106 needs a mechanism to resolve this conflict. This resolution can be based on policy priorities, specificity (a more specific policy overriding a general one), or other defined rules. Once all relevant policies have been evaluated, policy decision point 106 arrives at an authorization decision. This decision can be, for example, "allow", "deny", "not applicable" (if no relevant policies were found), or "indeterminate" (if there was an error or insufficient information to make a decision). The rationale or reasons for the decision can also be included, especially in complex systems where auditability and transparency are crucial.

In some examples, policy decision point 106 is a policy interpreter configured to interpret and evaluate policies in a structured text-based form such as in a JSON, XML, or XACML format. In this case, policy decision point 106 may parse the text-based policy according to a well-defined grammar or structure. This parsing may convert the interpretable policy text into a structured format or internal representation that policy decision point 106 can work with programmatically. Policy decision point 106 may be configured to extract various attributes from the access request, such as user identity, role, requested action, and target resource. Policy decision point 106 may tokenize the parse policy, breaking it down into individual components or lexemes. This tokenization step may include identification of keywords, operators, identifiers, and other fundamental policy elements of the policy. After tokenization, policy decision point 106 may perform semantic analysis to understand the meaning and context of the policy's conditions. Semantic analysis may include verifying if the policy's constructs align with known operations, actions, and attributes.

With an understood and structured representation of the policy, policy decision point 106 may evaluate the extracted attributes from the access request against the policy conditions. Depending on the policy's complexity, this could involve simple matches (e.g., 'user_role=="manager"') or more complex logical evaluations combining multiple conditions. If the interpretable text policy contains variables or placeholders, policy decision point 106 may resolve these with actual data from the access request or from external sources like policy information point 104. For example, a policy could state: "Users from [department] can access resources of type [resource_type] during [time_range]." Policy decision point 106 can replace the placeholders with actual values to evaluate the policy condition. Based on the evaluation against the policy conditions, policy decision point 106 may reach an authorization decision: "allow", "deny", "not applicable", or "indeterminate". If the policy conditions are satisfied, the request is permitted; otherwise, it may be denied.

Policy optimizer 112 can pre-compute or simplify parts of a computation or policy based on known or predictable information, leading to reduced workload for policy decision point 106 during actual runtime evaluation. When applied to interpretable text-based policies evaluated by policy decision point 106, optimization of policies performed by policy optimizer 112 can improve runtime evaluation performance.

Performance of policy decision point 106 in evaluating interpretable text-based policies can be improved through pre-parsing and tokenization by policy optimizer 112. Interpretable text-based policies require parsing and tokenization to be converted by policy optimizer 112 into a machine-understandable format. With optimization, this step can be done in advance by policy optimizer 112, so that policy decision point 106 does not have to repeatedly parse the same policy every time an access request arrives. By storing a pre-parsed or tokenized version of the policy, policy decision point 106 can jump straight to the evaluation phase, bypassing the time-consuming parsing step.

Performance of policy decision point 106 in evaluating interpretable text-based policies can be improved by policy optimizer 112 simplifying static conditions. Policies may have conditions or clauses that are static or invariant in that they do not (or rarely) change over time or across requests. For example, a condition might be: "All users from the 'IT' department can access the server between 9 AM and 5 PM." The time condition can be partially evaluated in advance by policy optimizer 112, especially outside of these hours, allowing policy decision point 106 to quickly deny any requests without further evaluation.

Performance of policy decision point 106 in evaluating interpretable text-based policies can be improved by policy optimizer 112 resolving known attributes. If certain attributes within the policy are known or predictable (e.g., company-wide regulations that don't change frequently), these can be pre-resolved by policy optimizer 112, reducing the complexity of the policy. Simplified or condensed versions of the policy referred to as "residual" policies can be created based on these pre-resolved attributes, allowing policy decision point 106 to evaluate a more streamlined version of the policy.

Performance of policy decision point 106 in evaluating interpretable text-based policies can be improved by policy optimizer 112 reducing policies to efficient representations. Policy optimizer 112 can transform text-based policies into more efficient intermediate representations or even machine code for specific scenarios or conditions. These residual forms can be faster to evaluate by policy decision point 106 than the original text-based version, especially for complex policies.

Performance of policy decision point 106 in evaluating interpretable text-based policies can be improved by policy optimizer 112 optimizing policy combinations. If multiple policies often apply to similar sets of requests, partial policy evaluator 112 can combine or integrate these policies into more efficient, unified versions, which can then be evaluated by policy decision point 106 more quickly than policy decision point 106 processing each policy individually.

Performance of policy decision point 106 in evaluating interpretable text-based policies can be improved by policy optimizer 112 pruning irrelevant policies. By analyzing historical access requests and their evaluations, policy optimizer 112 can identify policies that are rarely or never triggered. These policies can be set aside or given lower priority, ensuring that policy decision point 106 focuses on the most relevant and frequency used policies.

In some examples, policy decision point 106 of policy decision point 106 executes policies in an executable format generated by verified policy compiler 114. Using verified policy compiler 114 to convert policies into an executable format may offer a significant advantage in terms of performance for policy decision point 106. Instead of policy decision point 106 interpreting a policy at runtime, policy decision point 106 can directly execute it, thereby streamlining the decision-making process. Using verified policy compiler 114 can ensure that the advantages of compilation do not come at the expense of security, accuracy, or reliability.

At operation 410, policy decision point 106 packages the authorization decision for the access request, potentially along with other relevant details or obligations into a standardized data format such as XML, JSON, or XACML.

At operation 412, policy decision point 106 communicates the packaged decision back to policy enforcement point 108, which enforces the decision accordingly.

Example System and Method for Verifying a Policy Compiler

Figure 5:
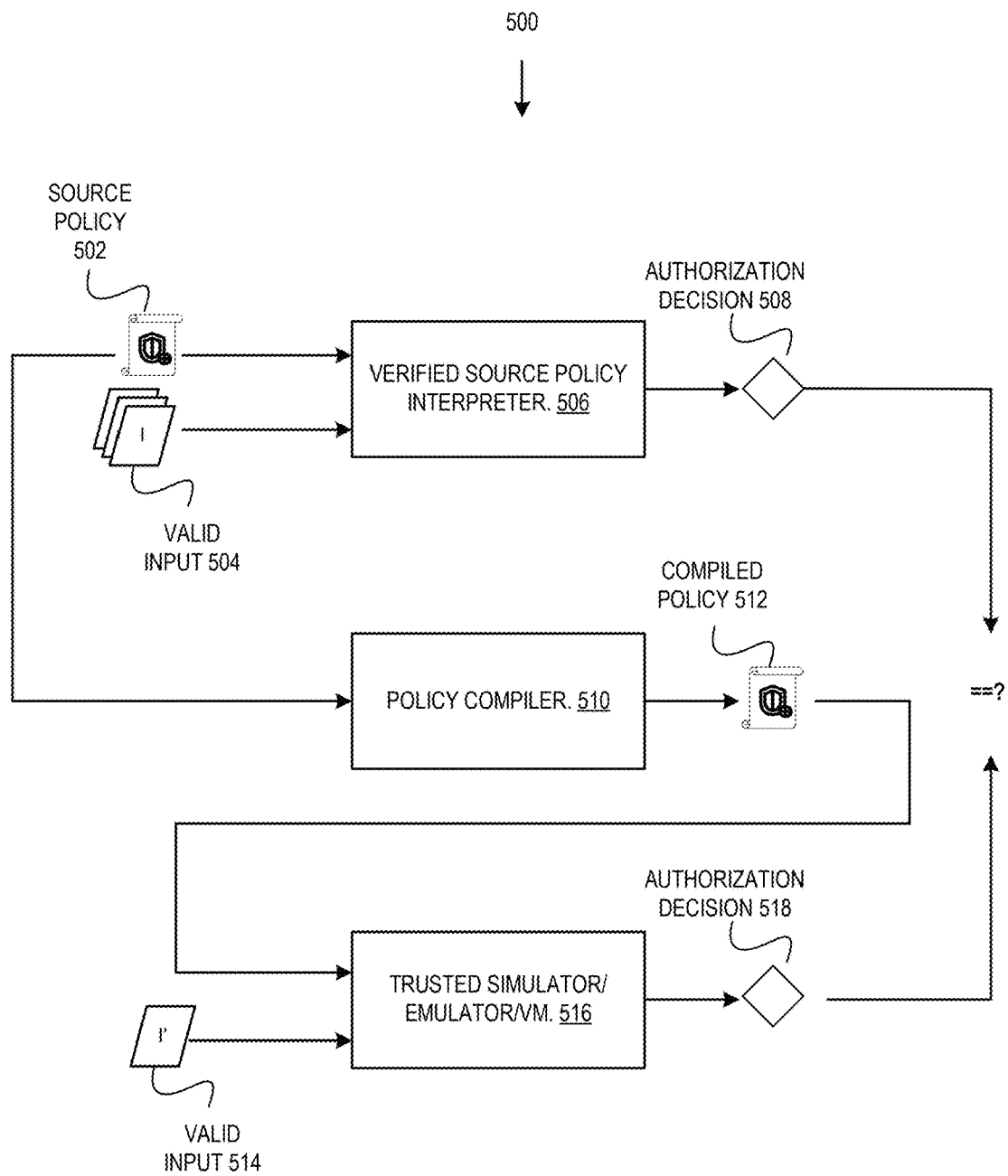
FIG. 5 illustrates an example system and method for verifying an access control policy compiler.

Turning to FIG. 5, it illustrates an example system and method for verifying a policy compiler. Once verified, the verified policy compiler may be a compiler that has been formally proven to correctly translate the semantics of policies in a structured text-based format (e.g., JSON, XML, XACML) into the semantics of a lower-level executable format such as machine code. The verified policy compiler may be associated with a mathematical proof that it correctly transforms the source policies in structured text-based format to the target machine code or other executable format, without introducing any unintended behavior. The mathematical proof may be made using an automated theorem prover or a proof assistant to construct a formal proof to show that for every valid source policy, the verified policy compiler produces an executable format that has the same observable behavior.

A source policy 502 in a structured text-based source policy language format along with a valid input 504 are inputs to verified source policy interpreter 506 which outputs an authorization decision 508 based on evaluating the source policy 502 against the valid input 504. Valid input 504 encompasses attributes of an arbitrary valid access request against which source policy 502 may be evaluated for authorization decision 508. The source policy 502 is an arbitrary valid policy in the source policy language or a subset thereof. The valid input 504 is an arbitrary valid input to the source policy 502.

In some examples, the source policy language is a "total functional language" where all policies in the source policy language have defined outputs for all possible inputs and are guaranteed to terminate without running indefinitely. For example, the source policy language does not support or allow implementation or interaction with any or all of: while and for loops, recursion, event listeners and callbacks, multiple threads of control, input/output waiting, infinite generators and iterators, synchronization primitives, or operating system or language-level signals and interrupts.

Verified source policy interpreter 506 is a source policy interpreter whose correctness has been formally proven or verified. Interpreter 506 is a computer program that can directly execute the source policy 502 written in a source policy language in the structured text-based source policy language format, without having to first compiled the source policy 502 into a bytecode or machine code format.

Verification of interpreter 506 may include proving that interpreter 506 correctly implements the semantics of the source policy language. This may involve a format specification that sets forth the semantics of the source policy language. The semantics act as a contract, detailing how any and all valid policies in the source policy language should behave. Verification of interpreter 506 may also include formal verification where interpreter 506 is proven to adhere to the formal specification. Specifically, it is shown that for every valid policy in the source policy language, interpreter 506 will evaluate it according to the semantics of the formal specification, without introducing errors or unexpected behaviors. In some examples, verification of interpreter 506 is aided by using automated reasoning tools or proof assistants that facilitate the verification process and are configured to handle the rigorous and detailed reasoning required to establish the correctness of interpreter 506. In some examples, interpreter 506 is written in a theorem proving language such as, for example, Dafny or the like.

The source policy 502 is also input to policy compiler being verified 510. Policy compiler 510 outputs during the verification process a compiled policy 512 in a bytecode or machine code format. For example, the compiled policy 512 may be in a Java Virtual Machine (JVM) bytecode format or other bytecode format such as, for example, Common Language Runtime (CLR) bytecode format, Python bytecode format, LLVM intermediate representation format, WebAssembly (Wasm) format, Ruby bytecode format, Erland beam bytecode format, Lue bytecode format, or other suitable bytecode format. Instead of a bytecode format, compiled policies 512 may be in a machine code format such as x86 or ARM.

The compiled policy 512 in a bytecode or machine code format are input along with valid input 514 to trusted simulator/emulator/virtual machine 516 which outputs authorization decision 518 based on executing the compiled policy 512 with valid input 514. Valid input 514 corresponding to valid input 504 are in a format suitable for processing/execution by simulator/emulator/virtual machine 516. For example, valid input 512 may be register or memory states or values of simulator/emulator/virtual machine 516 representing valid input 504. Simulator/emulator/virtual machine 516 is trusted in the sense that it is assumed to faithfully and correctly execute the compiled policy 512 in its bytecode or machine code format. For example, where the compiled policy 512 is in a machine code format such as ARM, simulator, emulator, or virtual machine 516 may be an ARM instruction set simulator, emulator, or virtual machine.

Where the compiled policy 512 is in a bytecode format such as JVM bytecode, simulator, emulator, or virtual machine 516 may a JVM.

To verify policy compiler 510, a proof is constructed for arbitrary valid source policy 502 and arbitrary valid input 504 that proves that authorization decision 508 equals authorization decision 518 for all valid source policies and all valid inputs. Specifically, access control policy compiler 510 is verified according to a proof that for (a) an arbitrary, valid source access control policy 502 in a source access control policy language, (b) an arbitrary, valid input 504 to the arbitrary, valid source access control policy 502, and (c) an encoding 514 of the arbitrary, valid input 504: (1) a verified source access control policy interpreter 506 for the source policy language, when evaluating (a) the arbitrary, valid source access control policy 502 against (b) the arbitrary, valid input 504, result in (e.g., outputs) the same authorization decision 508 as the authorization decision 518 output by trusted simulator/emulator/VM 516 for (2) an execution of a compiled executable version 512 of (a) the arbitrary, valid source access control policy 502; wherein an input to the execution of the compiled executable version 512 is (c) the encoding 514 of the arbitrary, valid input 502 suitable for input to the execution of the compiled execution version 512; wherein the compiled executable version 512 of (a) the arbitrary, valid source access control policy 502 is compiled by the access control policy compiler 510.

Figure 6:
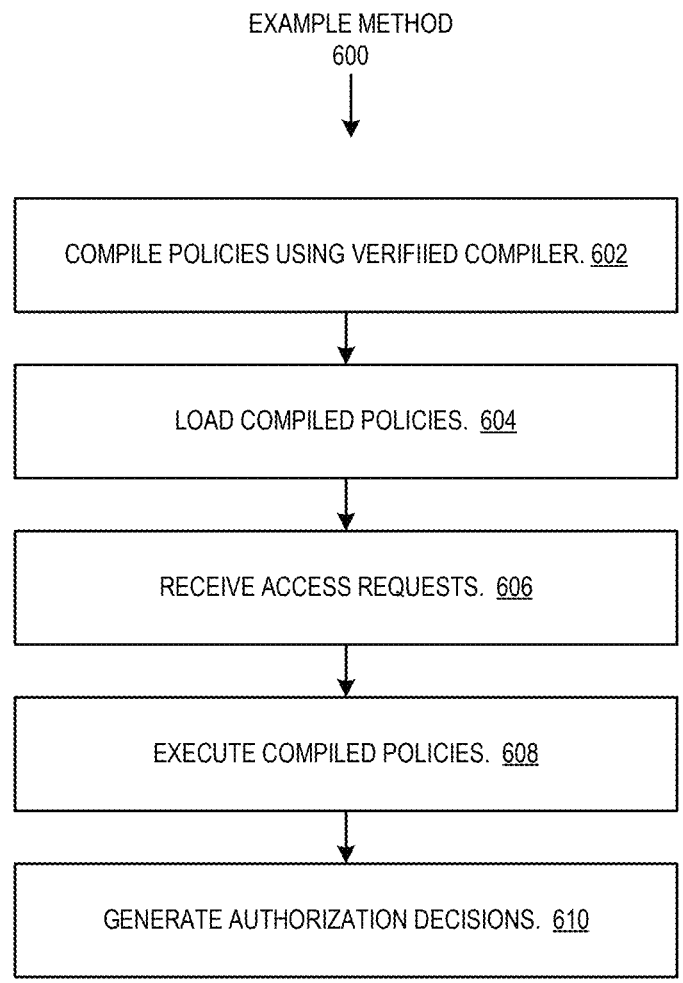
FIG. 6 illustrates an example method for executing policies compiled into an executable format by a verified policy compiler.

Example Method for Executing Policies Compiled into an Executable Format by a Verified Policy Compiler Turning for now to FIG. 6, it illustrates an example method for executing policies compiled into an executable format by a verified policy compiler. The verified policy compiler may be a compiler that has been formally proven to correctly translate the semantics of policies in a structured text-based format (e.g., JSON, XML, XACML) into the semantics of a lower-level executable format such as machine code. The verified policy compiler is associated with a mathematical proof that it correctly transfers the source policies in structured text-based format to the target machine code or other executable format, without introducing any unintended behavior. The mathematical proof may be made using an automated theorem prover or a proof assistant to construct a formal proof to show that for every valid source policy, the verified policy compiler produces an executable format that has the same observable behavior.

At operation 602, verified policy compiler 114 may accept input policies initially written in a high-level human-readable format. Verified policy compiler 114 may translate the policies into an executable format suitable for execution by policy decision point 106. This format could be machine code, bytecode, or other optimized format that can be executed directly by policy decision point 106.

Also at operation 602, verified policy compiler 114 may assure that the compilation of policies is correct and secure. In particular, verified policy compiler 114 may ensure that the compiled policies adhere strictly to the intended logic and semantics of the original policy, without introducing vulnerabilities or misinterpretations. In addition, verified policy compiler 114 may perform checks to ensure that the original policy does not have inherent vulnerabilities, contradictions, or other issues.

At operation 604, policy decision point 106, instead of selecting policies in a structured text-based form from policy information point 104, selects the compiled executable forms of the policies from policy information point 104. By executing the compiled forms, policy evaluation time and access request latency may be reduced because parsing and interpretation operations are avoided.

At operation 606, policy decision point 106 receives access requests. When an access request arrives at policy decision point 106, the relevant attributes are extracted from the access request such as user identity, roles, requested actions, target resources as usual.

At operation 608, policy decision point 106 of policy decision point 106 executes the compiled policies, passing in the relevant attributes from the access requests as input. Since the policies are in executable format, the evaluation of the policies by policy decision point 106 happens much faster than if it were interpreted from a high-level policy language. The compiled executable code of the compiled policies can directly assess the conditions, apply logic, and produce an outcome.

At operation 610, policy decision point 106 generates authorization decisions based on the evaluation of the compiled policies. For example, the outcome of executing one or more compiled policies for an access request may have policy decision point 106 its authorization decision such as "allow," "deny," "not applicable," or "indeterminate." The authorization decisions may be communicated back to policy enforcement point 108.

Example Method for Policy Optimization

Figure 7:
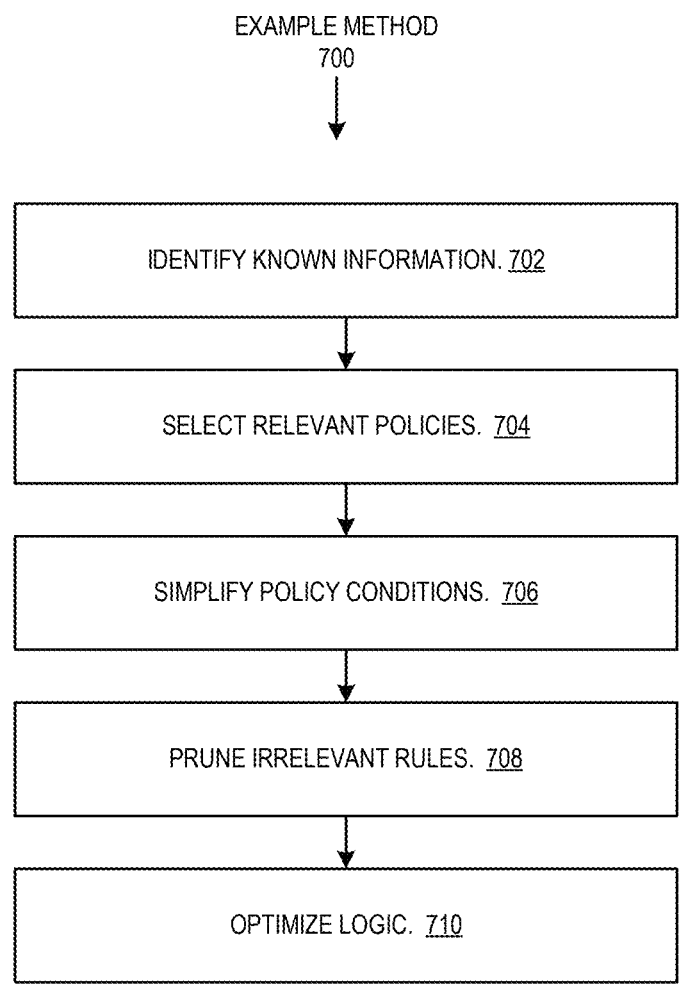
FIG. 7 illustrates an example method for policy optimization.

FIG. 7 illustrates an example method for policy optimization. At a high-level, example method 700 identifies known information 702 by determining what information is consistently known or predictable. This could be attributes like user roles, resource categories, or environmental conditions. At operation 704, relevant policies are selected to be partially evaluated using the known information. For example, if a user's role doesn't change frequently, policies pertaining to that role can be partially evaluated. At operation 706, policy conditions are simplified by evaluating parts of the policy that can be determined using the known information. These parts are then replaced with the results of the evaluation. For example, if a policy states: "Allow if user_role is 'manager' AND time is within working hours," and you know the user's role is 'manager', the policy can be simplified to: "Allow if time is within working hours." At operation 708, irrelevant rules are pruned. Any policy or rule that can be conclusively decided upon (either always true or always false) based on the known information can be removed or set aside. At operation 710, policy logic is optimized to remove redundancies. For example, collapsing and combining conditions, simplifying logic, or re-ordering rules for efficiency can be performed in this operation. The result of example method 700 is a residual policy that is simpler or smaller to evaluate by policy decision point 106 of policy decision point 106. The residual policy can also be compiled by verified policy compiler 114.

Returning to the top of example method 700, at operation 702, known information about is identified by policy optimizer 112. A policy may be viewed as a set of conditions defined by variables and some of these variables may derive their values from various data sources. A data source may be a mechanism to fetch or verify the availability and value of variables or attributes referenced in a policy. For example, the data source may be a mechanism to inference with database, user profiles, system configurations, environmental sensors, or other repositories of policy information.

The conditions of a policy may be converted into a standard form where each condition is represented as a (var, op, val) tuple, where 'var' is a variable, 'op' is an operator, and 'val' is a value. Each condition in the policy may be evaluated. The evaluation may split the condition to determine the (var, op, val) tuple. For example, if the target policy states that "The manager role is allowed access between the hours of 9 am and 5 pm," then the target policy may be split into two conditions tuples: ('role', '==', 'manager') and ('hour', 'between', '9 am and 5 pm'). It may then be determined using the data sources whether the variable 'var' value 'val' of the condition is consistently known for the target policy. If the variable 'var's value 'val' is known, then the condition is pre-evaluated based on the known value. For example, if the variable 'role' is consistently known to be 'manager,' then the condition ('role', '==', 'manager') can be pre-evaluated. If the value of the variable 'hour' is not consistently known, then the example target policy can be reduced by policy optimizer 112 to simply ('hour', 'between', '9 am and 5 pm') when evaluated by policy decision point 106 in the context where the subject of the access request has the 'manager' role.

At operation 704, relevant policies are selected by policy optimizer 112 to be partially evaluated using the known information. Selection may include iterating through a set of policies, checking the conditions within each policy against the known information, and selecting those policies which have conditions that can benefit from the known information for optimization. A goal here is to filter out policies which can be simplified or pre-evaluated based on the known information. By doing so, at runtime, policy decision point 106 can be more efficient, since some policy conditions are already resolved are reduced in complexity.

Operation 704 may include parsing and categorizing policies based on their conditions. Each condition can be compared against the known information. If a condition can be pre-evaluated or simplified with known information, the policy can be designated for optimization. By doing so, operation 704 identifies which policies to pre-process, ensuring that runtime policy evaluation becomes faster and more efficient.

At operation 706, policy conditions are simplified by policy optimizer 112 by evaluating parts of the policy that can be determined using the known information. Simplifying may include reducing the complexity of a policy by making the definitive decisions on certain conditions when possible. This may include iterating each condition of a target policy. For conditions that reference known information, that part of the condition can be evaluated. The result is a simplified or reduced version of the policy referred to as a "residual" policy.

For example, a target policy can first be parsed by policy optimizer 112 into individual conditions. For each condition, if the variable (e.g., 'role', 'hour', 'location') is in the known information, policy optimizer 112 evaluates the condition with the value of the variable from the known information. If a condition evaluates to true, policy optimizer 112 omits the condition from the residual policy because it does not need re-evaluation by policy decision point 106 at runtime. If a condition evaluates to false, then the entire policy cannot be satisfied (e.g., the entire policy is false) based on the known information. If a condition cannot be determined using the known information (e.g., because it uses a variable that is not in the known information), then the condition remains unchanged in the residual policy. If all conditions of the policy evaluate to true, then the policy is always satisfied by the known information. Otherwise, the policy can be represented as a conjunction of the remaining conditions that cannot be determined using the known information.

At operation 708, irrelevant rules are pruned from the policy. Policy optimizer 112 can prune (remove) rules from a target policy based on known information. If, based on the known information, policy optimizer 112 can conclusively determine a rule's outcome as either always true or always false based on the known information, policy optimizer 112 can prune that rule from the resulting residual policy. If a rule can be determined by policy optimizer 112 to be always true based on the known information, then policy optimizer 112 can remove it from the policy since its truth does not influence the policy's overall evaluation since it's a constant true. If a rule can be determined by policy optimizer 112 to always be false based on the known information, then the entire policy cannot be satisfied. In such cases, policy optimizer 112 can return an immediate failure or "false" outcome, since a single false rule in a conjunctive set (AND-based conditions) makes the whole policy false.

For example, operation 708 may include evaluating each rule of a target policy. If all its conditions can be conclusively decided as true based on the known information, the rule is pruned. If any condition is conclusively false, the entire rule (and by extension, the policy) is deemed false. If the rule can't be conclusively decided, it's retained. Operation 708 may result in a residual policy which may just be true or false if all rules can be decided.

The pruning process of operation 708 simplifies the policy, making subsequent runtime evaluations faster and more efficient for policy decision point 106.

Note that the above examples are simplified for purposes of illustration. A practical policy might be more complex, have nested conditions, or use alternative logical operators like OR.

At operation 710, policy logic is optimized by policy optimizer 112 to remove redundancies. Optimizing policy logic by policy optimizer 112 can make evaluation of residual policies by policy decision point 106 more efficient. Removing redundancies can simplify policy structure and reduce runtime computational costs. One optimization is collapsing and combining conditions. For example, if multiple rules have identical conditions, policy optimizer 112 can combine them to avoid repetitive checks. For example, if a policy has a rule 'role'=='manager' AND 'location'=='office' and another rule as 'role'=='manager' AND 'time'=='daytime', policy optimizer 112 can combine these rules as a single rule 'role'=='manager' AND ('location'=='office' OR 'time'=='daytime').

Another possible optimization is simplifying logic. Such simplification may include removing tautologies such as X or NOT X (which is always true), removing contradictions such as X AND NOT X (which is always false), simplifying conditions such as X AND TRUE to X and X OR FALSE TO X.

Another possible optimization is re-ordering rules for efficiency. For example, conditions that are more likely to be false can be evaluated earlier so that evaluation can exist as soon as a rule fails. Determining conditions that are more likely to be false can be based on domain knowledge or statistical information about the likelihood of conditions.

Within cloud provider network 100, policy information point 104, policy decision point 106, policy enforcement point 108, and policy administration point 102 can be interconnected in a secure, redundant, and highly available manner via internal network 110. Internal network 110 may encompass a high-speed, resilient network infrastructure, likely based on high-performance switches and routers. This backbone may ensure rapid communication between PIP 104, PDP 106, PEP 108, and PAP 102. All communication between these components may be encrypted (e.g., using TLS or SSL), ensuring policies and authorization decisions cannot be tampered with in transit. Given the importance of these components, each one, including PDP 106 and PEP 108, may have multiple instances running in different data centers or regions. Load balancers may ensure that traffic is distributed evenly and can be rerouted in case of any component failure.

PEP 108 may be integrated at every access point where policy-based enforcement is required. In cloud provider network 100, this could be at the level of API gateways, virtual machine hypervisors, database interfaces, etc.

PDP 106 receives requests from PEP 108, evaluates them with the help of data from PIP 104, and responds with a decision. PDP 106 may cache frequent decisions for performance.

PIP 104 may be a combination of databases, directory services (like LDAP/Active Directory), or even external APIs that provide real-time data.

PAP 102 may be a secure interface (such as a web-based dashboard) where administrators define policies. It may store these policies including partially evaluated or compiled versions thereof in PIP 102, which PDP 106 may access.

PIP 104 includes index 124 (which may be a set of indexes) for indexing polices, environmental data, and resource data. Policies may include attributes like subject, action, resource, and conditions. Index 124 may encompass any or all of: a subject index, an action index, a resource index, or a condition index. The subject index may organize policies by subject (e.g., user or role), allowing for quick look-up of all policies related to a specific user or group. The action index may organize policies by actions (e.g., read, write, delete), to quickly identify which subjects can perform a given action. The resource index may organize policies by the resources being accessed (e.g., file, database, URL) and is helpful for quickly determining who can access a specific resource and in what way. The condition index may organize policies by conditions such as, for example, if certain conditions (e.g., accessing from a specific location, during a certain time, etc.) are prevalent in multiple policies, they can be indexed for efficiency.

Environmental data 128 pertains to the context in which access is requested. Environmental data 128 could include details such as the current time, the IP address of the requester, the load on a system, etc. Indexes for environment data 128 may include, for example, a time-based index, a location-based index, or a system metric index. The time-based index may organize environment data 128 by timestamps, allowing for quick retrieval of environmental conditions at a particular time. The location-based index may organize environmental data 128 by geographic locations or IP address ranges, for systems where location is a crucial factor in decision-making. The system metrics index may organize environment data 128 by system metrics such as system load, active connections, etc.

Resource data 126 is about the specifics of the resources being accessed—files, databases, services, etc. Indexes for resource data 126 may include a resource type index, an ownership index, and a metadata index. The resource type index may organize resource data 126 by types of resources (e.g., file, API endpoint, database table). The ownership index may organize resource data 126 by the owner or responsible entity for each resource. This may be useful for scenarios where ownership dictates access (e.g., a user can only access their own files). The metadata index may organize resource data 126 if resource have metadata tags (e.g., "confidential", "finance", "HR"), then an index by these tags can be beneficial.

Index 124 may also encompass composite indexes for scenarios where policies require querying multiple attributes simultaneously (e.g., subject+resource or action+condition). In distributed system, data of index 124 may be sharded across multiple nodes and the indexing strategy may account for this distribution to ensure efficient data retrieval across shards. By appropriately indexing policies, environmental data, and resource data, policy information point 104 can ensure that policy evaluations are performed efficiently, even in environments with vast amounts of data and high request rates.

Customer devices 138 can encompass various types of programmable electronic devices with customer network 134 for accessing or interfacing with services in cloud provider network 100. For example, customer devices 138 can include any or all of: workstations, desktop computers, laptops, servers, smartphones, tablets, IoT devices, networking equipment, printers, scanners, point-of-sale (POS) systems, medical devices, industrial equipment, kiosks, ATMs, or virtual realty (VR) and augmented reality (AR) devices. These are just a few examples, and the actual devices would depend on the nature of the business, the industry, and the specific use cases the customer has for cloud provider network 100. For example, as the Internet of Things (IoT) continues to grow, the number and variety of devices connecting to the cloud are only expected to increase.

Customer network 134 may be connected to cloud provider network 100 via intermediate network 136. Intermediate network 136 may function as a transit or bridge network facilitating the connectivity between the customer's on-premises infrastructure and the cloud provider's infrastructure. Customer network 134 represents the on-premises infrastructure of the customer. For example, customer network 134 may encompass a local area network (LAN) that includes devices like servers, workstations, printers, switches, and other networked devices and edge Devices such as firewalls, routers, and VPN concentrators that manage traffic going out of customer network 134. Intermediate Network 136 may be a third-party network, a dedicated connectivity solution, or a carrier-neutral data center facilitating the connection. Intermediate network 136 may encompass transit router devices that forward traffic between customer network 134 and cloud provider network 100. Intermediate network 136 may encompass peering points where intermediate network 136 establishes a direct connection with cloud provider network 100. Cloud provider network 100 encompasses the infrastructure hosted by the cloud service provider. Cloud provider network 100 may include cloud entry points or other interfaces where the cloud provider network 100 connects with intermediate network 136. These can be direct connect locations, VPN endpoints, or other dedicated interconnects.

Example Provider Network

Figure 8:
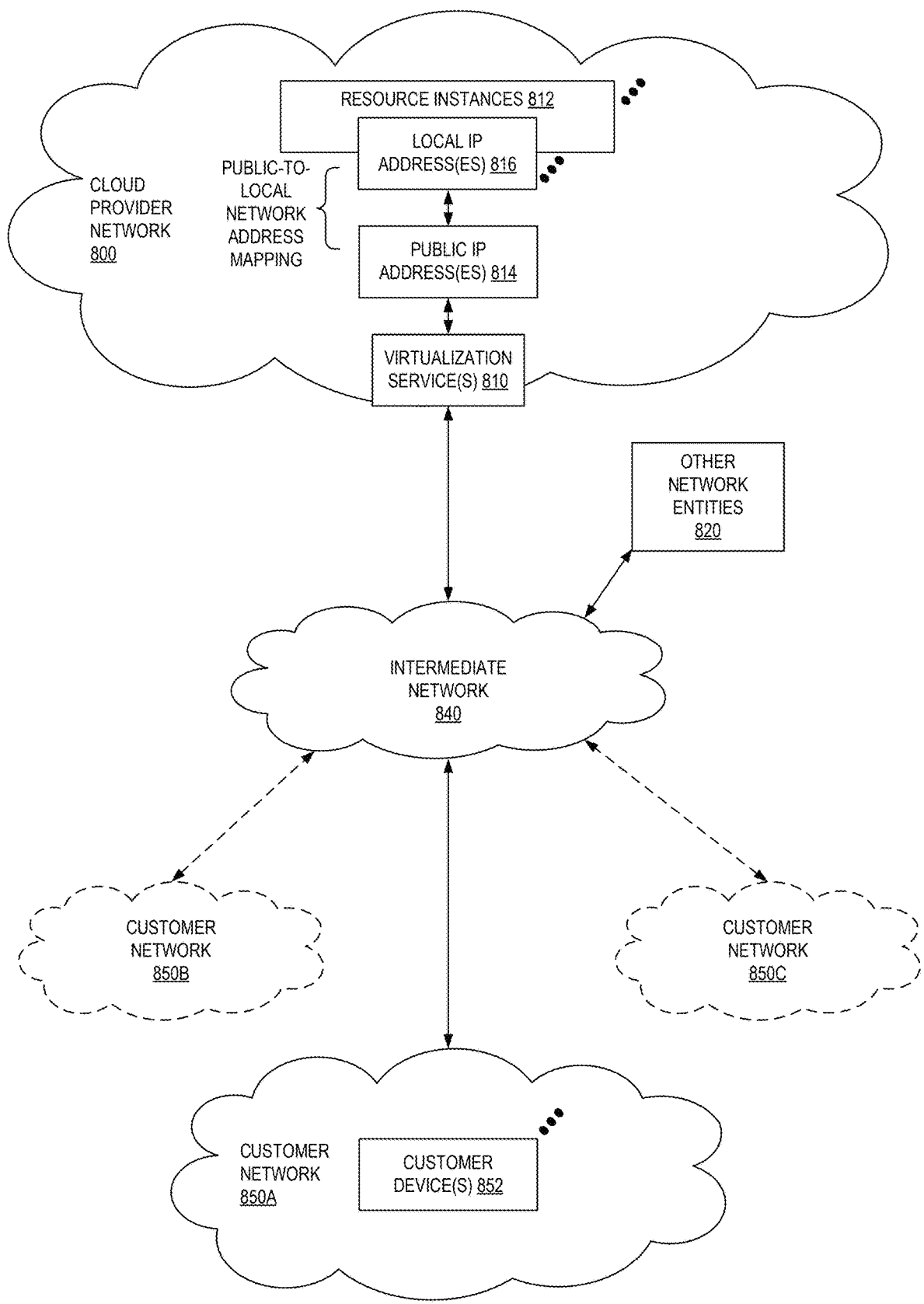
FIG. 8 illustrates an example cloud provider network environment according to some examples.

FIG. 8 illustrates an example provider network (or "service provider system") environment according to some examples. A provider network 800 can provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 can be associated with the resource instances 812; the local IP addresses are the internal network addresses of the resource instances 812 on the provider network 800. In some examples, the provider network 800 can also provide public IP addresses 814 and/or public IP address ranges (e.g., Internet Protocol version 4 (IPv4) or Internet Protocol version 6 (IPv6) addresses) that customers can obtain from the provider 800.

Conventionally, the provider network 800, via the virtualization services 810, can allow a customer of the service provider (e.g., a customer that operates one or more customer networks 850A-850C (or "client networks") including one or more customer device(s) 852) to dynamically associate at least some public IP addresses 814 assigned or allocated to the customer with particular resource instances 812 assigned to the customer. The provider network 800 can also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of the customer network(s) 850A-850C can, for example, implement customer-specific applications and present the customer's applications on an intermediate network 840, such as the Internet. Other network entities 820 on the intermediate network 840 can then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 can be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 800; a customer can then assign their allocated public IP addresses to particular resource instances allocated to the customer. These public IP addresses can be referred to as customer public IP addresses, or simply customer IP addresses. Instead of being assigned by the provider network 800 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Example Provider Network Environment

Figure 9:
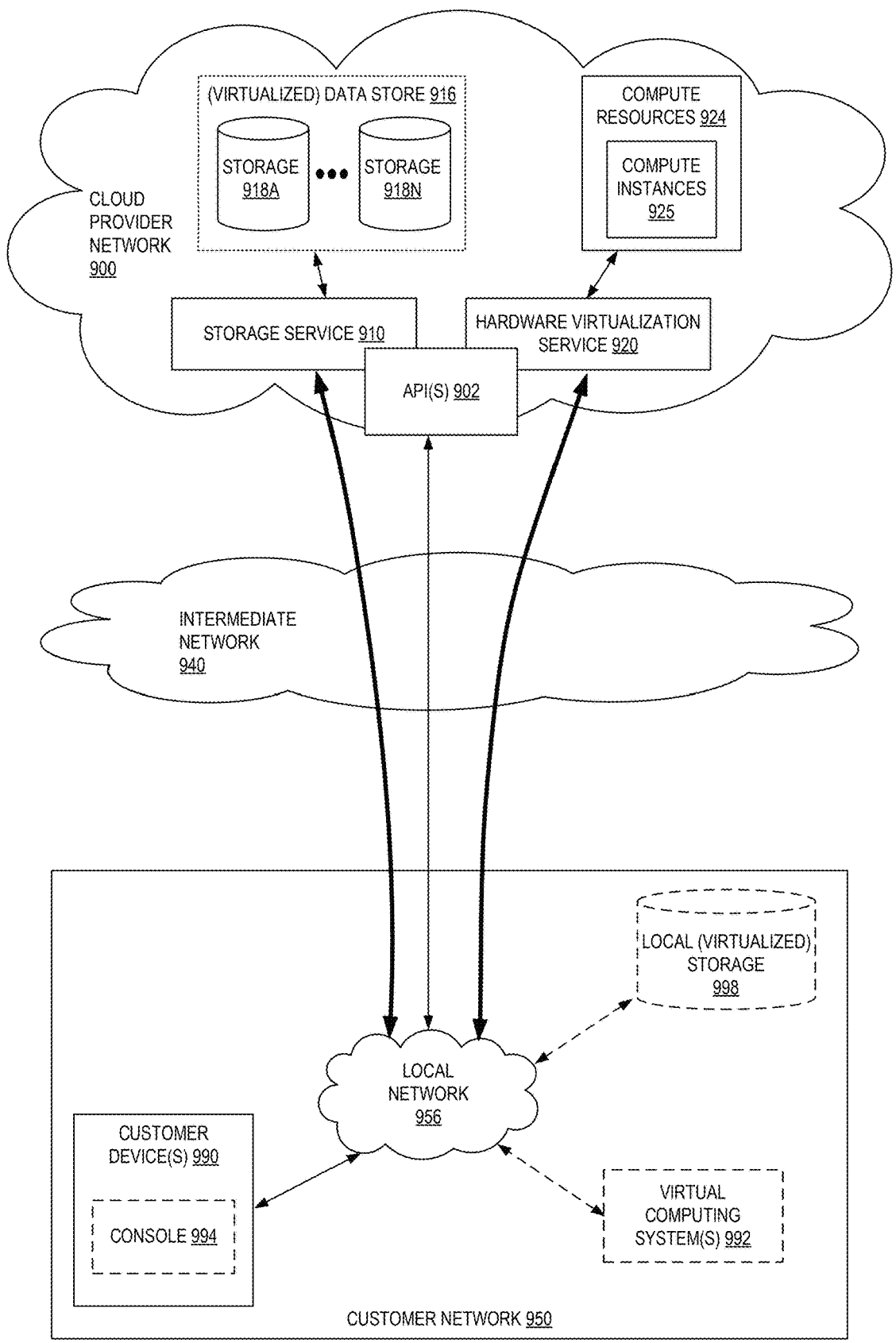
FIG. 9 is a block diagram of an example cloud provider network that provides a storage service and a hardware virtualization service to customers according to some examples.

FIG. 9 is a block diagram of an example provider network environment that provides a storage service and a hardware virtualization service to customers, according to some examples. A hardware virtualization service 920 provides multiple compute resources 924 (e.g., compute instances 925, such as VMs) to customers. The compute resources 924 can, for example, be provided as a service to customers of a provider network 900 (e.g., to a customer that implements a customer network 950). Each computation resource 924 can be provided with one or more local IP addresses. The provider network 900 can be configured to route packets from the local IP addresses of the compute resources 924 to public Internet destinations, and from public Internet sources to the local IP addresses of the compute resources 924.

The provider network 900 can provide the customer network 950, for example coupled to an intermediate network 940 via a local network 956, the ability to implement virtual computing systems 992 via the hardware virtualization service 920 coupled to the intermediate network 940 and to the provider network 900. In some examples, the hardware virtualization service 920 can provide one or more APIs 902, for example a web services interface, via which the customer network 950 can access functionality provided by the hardware virtualization service 920, for example via a console 994 (e.g., a web-based application, standalone application, mobile application, etc.) of a customer device 990. In some examples, at the provider network 900, each virtual computing system 992 at the customer network 950 can correspond to a computation resource 924 that is leased, rented, or otherwise provided to the customer network 950.

From an instance of the virtual computing system(s) 992 and/or another customer device 990 (e.g., via console 994), the customer can access the functionality of a storage service 910, for example via the one or more APIs 902, to access data from and store data to storage resources 918A-918N of a virtual data store 916 (e.g., a folder or "bucket," a virtualized volume, a database, etc.) provided by the provider network 900. In some examples, a virtualized data store gateway (not shown) can be provided at the customer network 950 that can locally cache at least some data, for example frequently accessed or critical data, and that can communicate with the storage service 910 via one or more communications channels to upload new or modified data from a local cache so that the primary store of data (the virtualized data store 916) is maintained. In some examples, a user, via the virtual computing system 992 and/or another customer device 990, can mount and access virtual data store 916 volumes via the storage service 910 acting as a storage virtualization service, and these volumes can appear to the user as local (virtualized) storage 998.

While not shown in FIG. 9, the virtualization service(s) can also be accessed from resource instances within the provider network 900 via the API(s) 902. For example, a customer, appliance service provider, or other entity can access a virtualization service from within a respective virtual network on the provider network 900 via the API(s) 902 to request allocation of one or more resource instances within the virtual network or within another virtual network.

Example Computing Device

Figure 10:
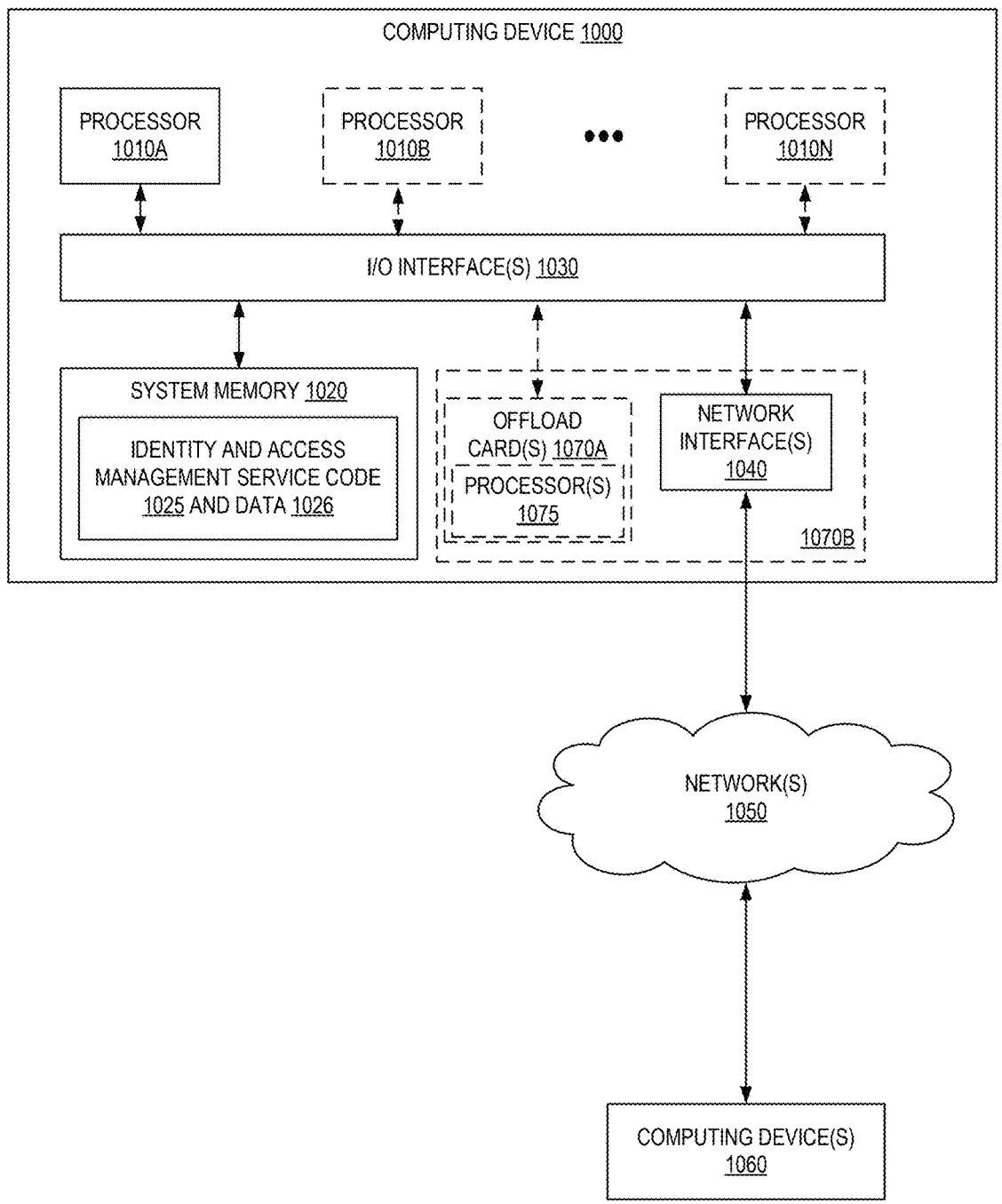
FIG. 10 is a block diagram illustrating an example computing device that can be used in some examples.

In some examples, a system that implements a portion or all of the techniques described herein can include a general-purpose computer system, such as the computing device 1000 (also referred to as a computing system or electronic device) illustrated in FIG. 10, that includes, or is configured to access, one or more computer-accessible media. In the illustrated example, the computing device 1000 includes one or more processors 1010 coupled to a system memory 1020 via an input/output (I/O) interface 1030. The computing device 1000 further includes a network interface 1040 coupled to the I/O interface 1030. While FIG. 10 shows the computing device 1000 as a single computing device, in various examples the computing device 1000 can include one computing device or any number of computing devices configured to work together as a single computing device 1000.

In various examples, the computing device 1000 can be a uniprocessor system including one processor 1010, or a multiprocessor system including several processors 1010 (e.g., two, four, eight, or another suitable number). The processor(s) 1010 can be any suitable processor(s) capable of executing instructions. For example, in various examples, the processor(s) 1010 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1010 can commonly, but not necessarily, implement the same ISA.

The system memory 1020 can store instructions and data accessible by the processor(s) 1010. In various examples, the system memory 1020 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1020 as identity and access management service code 1025 (e.g., executable to implement, in whole or in part, policy enforcement point 108, policy decision point 106, policy information point 104, policy administration point 102, policy decision point 106, policy optimizer 112 and/or verified policy compiler 114) and data 1026.

In some examples, the I/O interface 1030 can be configured to coordinate I/O traffic between the processor 1010, the system memory 1020, and any peripheral devices in the device, including the network interface 1040 and/or other peripheral interfaces (not shown). In some examples, the I/O interface 1030 can perform any necessary protocol, timing, or other data transformations to convert data signals from one component (e.g., the system memory 1020) into a format suitable for use by another component (e.g., the processor 1010). In some examples, the I/O interface 1030 can include support for devices attached through various types of peripheral buses, such as a variant of the Peripheral Component Interconnect (PCI) bus standard or the Universal Serial Bus (USB) standard, for example. In some examples, the function of the I/O interface 1030 can be split into two or more separate components, such as a north bridge and a south bridge, for example. Also, in some examples, some or all of the functionality of the I/O interface 1030, such as an interface to the system memory 1020, can be incorporated directly into the processor 1010.

The network interface 1040 can be configured to allow data to be exchanged between the computing device 1000 and other computing devices 1060 attached to a network or networks 1050, such as other computer systems or devices as illustrated in FIG. 1, for example. In various examples, the network interface 1040 can support communication via any suitable wired or wireless general data networks, such as types of Ethernet network, for example. Additionally, the network interface 1040 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1000 includes one or more offload cards 1070A or 1070B (including one or more processors 1075, and possibly including the one or more network interfaces 1040) that are connected using the I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1000 can act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some examples the offload card(s) 1070A or 1070B can perform compute instance management operations, such as pausing and/or un-pausing compute instances, launching and/or terminating compute instances, performing memory transfer/copying operations, etc. These management operations can, in some examples, be performed by the offload card(s) 1070A or 1070B in coordination with a hypervisor (e.g., upon a request from a hypervisor) that is executed by the other processors 1010A-1010N of the computing device 1000. However, in some examples the virtualization manager implemented by the offload card(s) 1070A or 1070B can accommodate requests from other entities (e.g., from compute instances themselves), and can not coordinate with (or service) any separate hypervisor.

In some examples, the system memory 1020 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1000 via the I/O interface 1030. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1000 as the system memory 1020 or another type of memory. Further, a computer-accessible medium can include transmission media or signals such as electrical, electromagnetic, or digital signals, conveyed via a communication medium such as a network and/or a wireless link, such as can be implemented via the network interface 1040.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1018A-1018N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
optimizing, at an access control policy administration point in a cloud provider network, a base access control policy to yield a residual access control policy;
compiling, by a verified access control policy compiler in the cloud provider network, the residual access control policy by:
  parsing the residual access control policy;
  transforming the residual access control policy to a target access control policy; and
  generating executable code based on the target access control policy to yield a compiled residual access control policy;
indexing, at an access control policy information point in the cloud provider network, the compiled residual access control policy;
receiving, at an access control policy enforcement point (PEP) in the cloud provider network, an access request;
retrieving, by an access control policy decision point (PDP) in the cloud provider network, the compiled residual access control policy from an index based on one or more attributes of the access request;
evaluating, at the access control PDP in the cloud provider network, the access request against the compiled residual access control policy to determine an authorization decision; and
returning, by the access control PDP in the cloud provider network, the authorization decision to the access control PEP.

2. The computer-implemented method of claim 1, wherein optimizing a base access control policy to yield a residual access control policy is based on known information.

3. The computer-implemented method of claim 1, further comprising:
intercepting, at the access control PEP, the access request;
determining, at the access control PEP, that the access request is subject to access control;
requesting, by the access control PEP, the access control PDP to evaluate the access request;
receiving, at the access control PEP, the authorization decision from the access control PDP; and
allowing, by the access control PEP, the access request to proceed based on the authorization decision.

4. A computer-implemented method comprising:
optimizing a base access control policy to yield a residual access control policy;
compiling, by a verified access control policy compiler, the residual access control policy by:
  parsing the residual access control policy;
  transforming the residual access control policy to a target access control policy; and
  generating executable code based on the target access control policy to yield a compiled residual access control policy;
indexing the compiled residual access control policy;
receiving an access request;
retrieving the compiled residual access control policy from an index based on one or more attributes of the access request;
evaluating the access request against the compiled residual access control policy to determine an authorization decision; and
returning the authorization decision.

5. The computer-implemented method of claim 4, wherein optimizing a base access control policy to yield a residual access control policy is based on known information.

6. The computer-implemented method of claim 4, further comprising:
intercepting, at an access control policy enforcement point (PEP), the access request;
determining, at the access control PEP, that the access request is subject to access control;
requesting, by the access control PEP, an access control policy decision point (PDP) to evaluate the access request;
receiving, at the access control PEP, the authorization decision from the access control PDP; and
allowing, by the access control PEP, the access request to proceed based on the authorization decision.

7. The computer-implemented method of claim 4, wherein the residual access control policy comprises statements, rules, or conditions of the base access control policy with one or more statements, rules, or conditions of the base access control policy pre-evaluated or removed.

8. The computer-implemented method of claim 4, further comprising:
receiving, at an access control policy decision point (PDP), the access request;
querying, by the access control PDP, an access control policy information point for selected policies applicable to the access request;
determining, by the access control PDP, a subset of the selected policies that are relevant to the access request as relevant policies, the relevant policies comprising the residual access control policy;
evaluating, by the access control PDP, the access request against the relevant policies;
packaging, by the access control PDP, the authorization decision as a packaged decision; and
communicating, by the access control PDP, the packaged decision to an access control policy enforcement point.

9. The computer-implemented method of claim 4, further comprising:
identifying, by an access control policy optimizer, known information; and
simplifying, by the access control policy optimizer, one or more access control policy conditions of the base access control policy based on the known information.

10. The computer-implemented method of claim 4, further comprising verifying an access control policy compiler according to a proof to yield the verified access control policy compiler, wherein the proof is that for (a) an arbitrary, valid source access control policy in a source access control policy language, (b) an arbitrary, valid input to the arbitrary, valid source access control policy, and (c) an encoding of the arbitrary, valid input, (1) a verified source access control policy interpreter for the source policy language, when evaluating (a) the arbitrary, valid source access control policy against (b) the arbitrary, valid input, results in a same authorization decision as (2) an execution of a compiled executable version of (a) the arbitrary, valid source access control policy, wherein an input to the execution of the compiled executable version is (c) the encoding of the arbitrary, valid input suitable for input to the execution of the compiled execution version, wherein the compiled executable version of (a) the arbitrary, valid source access control policy is compiled by the access control policy compiler, and wherein equivalence between the compiled residual access control policy and the residual access control policy follows from the verified access control policy compiler being verified according to the proof.

11. The computer-implemented method of claim 4, further comprising:
   compiling, by the verified access control policy compiler, a raw access control policy to yield a compiled access control policy;
   indexing the compiled access control policy;
   receiving a second access request, wherein the access request is a first access request;
   retrieving the compiled access control policy from the index based on one or more attributes of the second access request;
   evaluating the second access request against the compiled access control policy to determine a second authorization decision, wherein the authorization decision is a first authorization decision; and
   returning the second authorization decision.

12. The computer-implemented method of claim 4, further comprising:
   receiving a second access request, wherein the access request is a first access request;
   retrieving the compiled residual access control policy from the index based on one or more attributes of the second access request;
   evaluating the second access request against the compiled residual access control policy to determine a second authorization decision, wherein the authorization decision is a first authorization decision; and
   returning the second authorization decision.

13. A system comprising:
   a first one or more computing devices to implement an access control policy administration point (PAP) in a cloud provider network, the access control PAP including instructions that upon execution by one or more processors cause the access control PAP to:
      optimize a base access control policy to yield a residual access control policy; and
      compile, by a verified access control policy compiler of the access control PAP, the residual access control policy by:
         parsing the residual access control policy;
         transforming the residual access control policy to a target access control policy; and
         generating executable code based on the target access control policy to yield a compiled residual access control policy;
   a second one or more computing devices to implement an access control (PIP) in the cloud provider network, the access control (PIP) including instructions that upon execution by one or more processors cause the access control (PIP) to:
      index the compiled residual access control policy;
   a third one or more computing devices to implement an access control policy decision point (PDP) in the cloud provider network, the access control PDP including instructions that upon execution by one or more processors cause the access control (PIP) to:
      receive an access request;
      retrieve the compiled residual access control policy from an index based on one or more attributes of the access request;
      evaluate the access request against the compiled residual access control policy to determine an authorization decision; and
      return the authorization decision.

14. The system of claim 13, the access control PAP further including instructions that upon execution cause the access control PAP to optimize the base access control policy to yield the residual access control policy based on known information.

15. The system of claim 13, further comprising:
   a fourth one or more computing devices to implement an access control policy enforcement point (PEP) in the cloud provider network, the access control PEP including instructions that upon execution by one or more processors cause the access control PEP to:
      intercept the access request;
      determine that the access request is subject to access control;
      request the access control PDP to evaluate the access request;
      receive the authorization decision from the access control PDP; and
      allow the access request to proceed based on the authorization decision.

16. The system of claim 13, wherein the residual access control policy comprises statements, rules, or conditions of the base access control policy with one or more statements, rules, or conditions of the base access control policy pre-evaluated or removed.

17. The system of claim 13, the access control PDP further including instructions that upon execution by one or more processors cause the access control policy decision point to:
   query the access control (PIP) for selected policies applicable to the access request;
   determine a subset of the selected policies that are relevant to the access request as relevant policies, the relevant policies comprising the residual access control policy;
   evaluate the access request against the relevant policies;
   package the authorization decision as a packaged decision; and
   communicate the packaged decision to an access control policy enforcement point.

18. The system of claim 13, the access control PAP further including instructions that upon execution by one or more processors cause the access control PAP to:
   identify known information; and
   simplify one or more access control policy conditions of the base access control policy based on the known information.

19. The system of claim 13, the access control PAP further including instructions that upon execution by one or more processors cause the access control PAP to:
   compile, by the verified access control policy compiler, a raw access control policy to yield a compiled access control policy;
   the access control (PIP) further including instructions that upon execution by one or more processors cause the access control (PIP) to:
      index the compiled access control policy; and
   the access control PDP further including instructions that upon execution by one or more processors cause the access control PDP to:

receive a second access request, wherein the access request is a first access request;

retrieve the compiled access control policy from the index based on one or more attributes of the second access request;

evaluate the second access request against the compiled access control policy to determine a second authorization decision, wherein the authorization decision is a first authorization decision; and return the second authorization decision.

20. The system of claim 13, the access control PDP further including instructions that upon execution by one or more processors cause the access control PDP to:

receive a second access request, wherein the access request is a first access request;

retrieve the compiled residual access control policy from the index based on one or more attributes of the second access request;

evaluate the second access request against the compiled residual access control policy to determine a second authorization decision, wherein the authorization decision is a first authorization decision; and return the second authorization decision.

\* \* \* \* \*